United States Patent
Li et al.

(10) Patent No.: US 9,980,241 B2
(45) Date of Patent: May 22, 2018

(54) NODE SYNCHRONIZATION METHOD AND APPARATUS

(71) Applicant: Huawei Technologies Co., Ltd., Shenzhen (CN)

(72) Inventors: Qiang Li, Beijing (CN); Zhiyu Yan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 14/939,903

(22) Filed: Nov. 12, 2015

(65) Prior Publication Data

US 2016/0073367 A1   Mar. 10, 2016

Related U.S. Application Data

(63) Continuation of application No. PCT/CN2013/082403, filed on Aug. 27, 2013.

(30) Foreign Application Priority Data

May 13, 2013   (WO) ................ PCT/CN2013/075560

(51) Int. Cl.
*H04W 56/00* (2009.01)
*H04W 74/08* (2009.01)
*H04W 88/02* (2009.01)

(52) U.S. Cl.
CPC ..... *H04W 56/001* (2013.01); *H04W 56/0045* (2013.01); *H04W 74/0833* (2013.01); *H04W 88/02* (2013.01)

(58) Field of Classification Search
CPC .......................... H04W 56/001; H04W 56/0015
See application file for complete search history.

(56) References Cited

U.S. PATENT DOCUMENTS

| 2010/0054237 A1 | 3/2010 | Han et al. |
| 2011/0281571 A1 | 11/2011 | Patel et al. |

(Continued)

FOREIGN PATENT DOCUMENTS

| CN | 101668333 A | 3/2010 |
| CN | 102612134 A | 7/2012 |

(Continued)

OTHER PUBLICATIONS

"Scenarios and solutions for radio-interface based synchronization mechanisms," 3GPP TSG RAN WG1 Meeting #73, Fukuoka, Japan, R1-131856, $3^{rd}$ Generation Partnership Project, Valbonne, France (May 20-24, 2013).

(Continued)

*Primary Examiner* — Raj Jain
(74) *Attorney, Agent, or Firm* — Leydig, Voit & Mayer, Ltd.

(57) ABSTRACT

Embodiments of the present disclosure disclose a node synchronization method and apparatus, and relate to the field of communications technologies, where the method includes: selecting, by a first node, at least one user equipment UE, where the UE is used to assist a second node to synchronize with the first node; and sending, by the first node, a notification message to the at least one UE, so that the at least one UE assists the second node to implement synchronization with the first node. The present disclosure is applicable to time synchronization between communications nodes.

8 Claims, 14 Drawing Sheets

A first node selects at least one user equipment UE, where the at least one UE is used to assist a second node to synchronize with the first node — 101

The first node sends a notification message to the selected at least one UE, so that the at least one UE assists the second node to implement synchronization with the first node — 102

(56) References Cited

U.S. PATENT DOCUMENTS

| | | | |
|---|---|---|---|
| 2012/0236977 A1 | 9/2012 | Zou et al. | |
| 2013/0244653 A1* | 9/2013 | Song | H04W 56/001 455/436 |
| 2016/0073367 A1* | 3/2016 | Li | H04W 56/001 370/350 |

FOREIGN PATENT DOCUMENTS

| | | |
|---|---|---|
| CN | 103200665 A | 7/2013 |
| WO | WO 2012138933 A1 | 10/2012 |

OTHER PUBLICATIONS

"Radio-interface based synchronization mechanisms," 3GPP TSG RAN WG1 Meeting #74, Barcelona, Spain, R1-132893, $3^{rd}$ Generation Partnership Project, Valbonne, France (Aug. 19-23, 2013).

* cited by examiner

NODE SYNCHRONIZATION METHOD AND APPARATUS

CROSS-REFERENCE TO RELATED APPLICATIONS

This application is a continuation of International Patent Application No. PCT/CN2013/082403, filed on Aug. 27, 2013, which claims priority to International Patent Application No. PCT/CN2013/075560, filed on May 13, 2013, both of which are hereby incorporated by reference in their entireties.

TECHNICAL FIELD

The present disclosure relates to the field of communications technologies, and in particular, to a node synchronization method and apparatus.

BACKGROUND

With development of mobile terminals and data services, demand for data service traffic increases massively. To meet the soaring traffic demand, small cells may be deployed in hotspot areas based on a conventional macro cellular network. A small cell has small coverage and low transmit power, and can provide a high-rate data transmission service, so as to perform data offloading for a macro cellular network and reduce network deployment costs of an operator. Forms of a small cell include: a metropolitan cell Metro cell, a micro cell Micro cell, a pico cell Pico cell, a home NodeB, Femto cell, and a WLAN (Wireless Local Area Network) using a Wi-Fi (Wireless Fidelity) technology. Each small cell may be deemed a transmitting/receiving node.

After a group of nodes are deployed in the foregoing manner, time synchronization needs to be performed for the group of nodes, so as to implement technologies such as dynamic switching of a cell and dual connectivity for a user after the synchronization and improve network operation efficiency. An existing timing synchronization method includes: determining a time-synchronized node as a synchronization source, and implementing, by a to-be-synchronized node, time synchronization by receiving a synchronization signal of the synchronization source node.

At least the following problem exists in the prior art: In the foregoing synchronization process, the to-be-synchronized node needs to receive information from the synchronization source node, but the to-be-synchronized node may not be capable of receiving the information sent by the synchronization source node. For example, in an FDD (Frequency Division Duplex) system, if the to-be-synchronized node and the synchronization source node have a same operating frequency, a synchronization reference signal sent by the synchronization source node can be sent only on a downlink frequency, but the to-be-synchronized node is generally not capable of receiving on a downlink frequency. Similarly, in a TDD (Time Division Duplex) system, if the to-be-synchronized node and the synchronization source node have different operating frequencies, the to-be-synchronized node is generally not capable of receiving a signal on an operating frequency of the synchronization source node either.

SUMMARY

A node synchronization method and apparatus are provided to solve a problem that time synchronization cannot be implemented between nodes in a network deployment scenario of a small cell, and improve network operation efficiency.

According to a first aspect, a node synchronization method is provided, including:

selecting, by a first node, at least one user equipment UE, where the at least one UE is used to assist a second node to synchronize with the first node; and sending, by the first node, a notification message to the at least one UE, so that the at least one UE assists the second node to implement synchronization with the first node.

In a first possible implementation manner, before the sending, by the first node, a notification message to the at least one UE, the method further includes:

sending, by the first node, a downlink message to the at least one UE;

receiving, by the first node, a random access message sent by the at least one UE; and sending, by the first node, a timing advance T1 to the at least one UE, where the timing advance T1 is a timing advance of time of sending an uplink signal against time of arrival of a corresponding downlink signal at the UE, where the uplink signal is sent by the at least one UE to the first node, and the corresponding downlink signal is sent by the first node to the at least one UE.

Further, before the selecting, by a first node, at least one user equipment UE, the method further includes: receiving, by the first node, synchronization request information sent by the second node.

Further, the method further includes: sending, by the first node, random access signal sequence information or synchronization-assisting specific signal sequence information to the at least one UE, where the random access signal sequence information or the synchronization-assisting specific signal sequence information is used for the UE to assist the second node to synchronize with the first node.

Specifically, the selecting, by a first node, at least one user equipment UE includes: selecting, by the first node among UEs in coverage according to reference signal received powers RSRPs of the UEs from the second node, a UE on which a power of a reference signal received from the second node is greater than a first preset value, where the RSRPs are sent by the UEs in the coverage; or selecting, by the first node among UEs in coverage according to reference signal received powers RSRPs of the UEs from the first node, a UE on which a power of a reference signal received from the first node is greater than a second preset value, where the RSRPs are sent by the UEs in the coverage; or selecting, by the first node among UEs in coverage according to reference signal received powers RSRPs of the UEs from the first node and the second node, a UE on which a power of a reference signal received from the second node is greater than a first preset value and on which a power of a reference signal received from the first node is greater than a second preset value, where the RSRPs are sent by the UEs in the coverage.

With reference to the first aspect or the first possible implementation manner of the first aspect, in a second possible implementation manner, after the selecting at least one user equipment UE, the method further includes: sending, by the first node, identification information of the at least one UE and/or random access signal sequence information or synchronization-assisting specific signal sequence information to the second node, so that the second node determines the at least one UE according to the identification information and/or the random access signal sequence information or the synchronization-assisting specific signal sequence information.

Further, after the sending, by the first node, a downlink message to the at least one UE, the method further includes: receiving, by the first node, a timing offset sent by the at least one UE, where the timing offset is a downlink sending time offset between the second node and the first node.

The timing offset is determined by the at least one UE according to at least the timing advance T1, a timing advance T2 determined by the second node, a moment of receiving the downlink message of the first node by the at least one UE, and a moment of receiving a downlink message of the second node by the at least one UE.

Further, the method further includes: sending, by the first node, the timing offset to the second node.

According to a second aspect, a node synchronization method is provided, including:

receiving, by a second node, identification information of at least one user equipment UE or random access signal sequence information sent by a first node;

determining, by the second node, the at least one UE according to the identification information of the at least one UE or the random access signal sequence information; and implementing, by the second node, synchronization with the first node by using the determined at least one UE.

In a first possible implementation manner, before the receiving, by a second node, identification information of at least one user equipment UE or random access signal sequence information sent by a first node, the method further includes: sending, by the second node, synchronization request information to the first node.

Further, before the implementing, by the second node, synchronization with the first node by using the determined at least one UE, the method further includes: sending, by the second node, a downlink message to the at least one UE; receiving, by the second node, a random access message sent by the at least one UE; and sending, by the second node, a timing advance T2 to the at least one UE, where the timing advance T2 is a timing advance of time of sending an uplink signal against time of arrival of a corresponding downlink signal at the UE, where the uplink signal is sent by the at least one UE to the second node, and the corresponding downlink signal is sent by the second node to the at least one UE.

Further, before the implementing, by the second node, synchronization with the first node by using the determined at least one UE, the method further includes: receiving, by the second node, a timing advance sent by the at least one UE or the first node, where the timing advance is determined by the at least one UE according to at least the timing advance T2, a timing advance T1 determined by the first node, a moment of receiving a downlink message of the first node by the at least one UE, and a moment of receiving the downlink message of the second node by the at least one UE.

Specifically, the implementing, by the second node, synchronization with the first node by using the determined at least one UE includes:

adjusting, by the second node, transmitting time according to the timing offset, and implementing the synchronization with the first node.

Optionally, if the second node receives at least two timing offsets sent by the at least one UE or the first node, before the implementing, by the second node, synchronization with the first node according to the timing offset, the method further includes:

performing, by the second node, a mathematical operation according to the received at least two timing offsets, and using an operation result as a timing offset for the second node to adjust the transmitting time.

Further, the method further includes:

determining, by the second node, whether a current synchronization offset state exceeds a set threshold; and sending, by the second node, synchronization request information to the first node if the current synchronization offset state exceeds the set threshold.

According to a third aspect, a node synchronization method is provided, including:

receiving, by user equipment UE, a notification message sent by a first node, where the notification message is used to instruct the UE to assist a second node to implement synchronization with the first node;

calculating, by the UE, a timing offset between the first node and the second node; and sending, by the UE, the timing offset to the first node or the second node.

In a first possible implementation manner, before the calculating, by the UE, a timing offset between the first node and the second node, the method further includes:

receiving, by the UE, a downlink message sent by the first node;

sending, by the UE, a random access message to the first node; and receiving, by the UE, a timing advance T1 sent by the first node, where the timing advance T1 is a timing advance of time of sending an uplink signal against time of arrival of a corresponding downlink signal at the UE, where the uplink signal is sent by the UE to the first node, and the corresponding downlink signal is sent by the first node to the UE.

Further, before the calculating, by the UE, a timing offset between the first node and the second node, the method further includes:

receiving, by the UE, a downlink message sent by the second node;

sending, by the UE, a random access message to the second node; and receiving, by the UE, a timing advance T2 sent by the second node, where the timing advance T2 is a timing advance of time of sending an uplink signal against time of arrival of a corresponding downlink signal at the UE, where the uplink signal is sent by the UE to the second node, and the corresponding downlink signal is sent by the second node to the UE.

Specifically, the calculating, by the UE, a timing offset between the first node and the second node includes:

calculating, by the UE, the timing offset according to at least a moment t1 of receiving the downlink message sent by the first node, a moment t2 of receiving the downlink message sent by the second node, the timing advance T1, and the timing advance T2.

Specifically, the calculating, by the UE, a timing offset between the first node and the second node includes:

using a formula $$\Delta T = \left(t2 - t1 - \frac{T2 - T1}{2}\right) \text{ or } \Delta T = \pm\left(t2 - t1 - \frac{T2 - T1}{2}\right)$$

to calculate the timing offset of the second node, where $\Delta T$ is the timing offset.

According to a fourth aspect, a node synchronization apparatus is provided, including:

a selecting unit, configured to select at least one user equipment UE, where the at least one UE is used to assist a second node to synchronize with a apparatus; and a sending unit, configured to send a notification message to the at least one UE, so that the at least one UE assists the second node to implement synchronization with the apparatus.

In a first possible implementation manner, the sending unit is further configured to send a downlink message to the at least one UE, and the apparatus further includes:

a receiving unit, configured to receive a random access message sent by the at least one UE; and the sending unit is further configured to send a timing advance T1 to the at least one UE, where the timing advance T1 is a timing advance of time of sending an uplink signal against time of arrival of a corresponding downlink signal at the UE, where the uplink signal is sent by the at least one UE to the apparatus, and the corresponding downlink signal is sent by the apparatus to the at least one UE.

Further, the receiving unit is further configured to receive synchronization request information sent by the second node.

The selecting unit is specifically configured to select, among UEs in coverage according to reference signal received powers RSRPs of the UEs from the second node, a UE on which a power of a reference signal received from the second node is greater than a first preset value, where the RSRPs are sent by the UEs in the coverage; or select, among UEs in coverage according to reference signal received powers RSRPs of the UEs from the apparatus, a UE on which a power of a reference signal received from the apparatus is greater than a second preset value, where the RSRPs are sent by the UEs in the coverage; or select, among UEs in coverage according to reference signal received powers RSRPs of the UEs from the apparatus and the second node, a UE on which a power of a reference signal received from the second node is greater than a first preset value and on which a power of a reference signal received from apparatus node is greater than a second preset value, where the RSRPs are sent by the UEs in the coverage.

Further, the sending unit is further configured to send random access signal sequence information or synchronization-assisting specific signal sequence information to the at least one UE, where the random access signal sequence information or the synchronization-assisting specific signal sequence information is used for the UE to assist the second node to synchronize with the apparatus.

With reference to the fourth aspect or the first possible implementation manner of the fourth aspect, in a second possible implementation manner, the sending unit is further configured to send identification information of the at least one UE and/or random access signal sequence information or synchronization-assisting specific signal sequence information to the second node, so that the second node determines the at least one UE according to the identification information and/or the random access signal sequence information or the synchronization-assisting specific signal sequence information.

Further, the receiving unit is further configured to receive a timing offset sent by the at least one UE, where the timing offset is a downlink sending time offset between the second node and the apparatus.

The timing offset is determined by the at least one UE according to at least the timing advance T1, a timing advance T2 determined by the second node, a moment of receiving the downlink message of the apparatus by the at least one UE, and a moment of receiving a downlink message of the second node by the at least one UE.

Further, the sending unit is further configured to send the timing offset to the second node.

According to a fifth aspect, a node synchronization apparatus is provided, including:

a receiving unit, configured to receive identification information of at least one user equipment UE or random access signal sequence information sent by a first node;

a determining unit, configured to determine the at least one UE according to the identification information of the at least one UE or the random access signal sequence information; and a synchronizing unit, configured to implement synchronization with the first node by using the determined at least one UE.

In a first possible implementation manner, the apparatus further includes:

a sending unit, configured to send synchronization request information to the first node.

Further, the sending unit is further configured to send a downlink message to the at least one UE, and therefore, the receiving unit is further configured to receive a random access message sent by the at least one UE; and the sending unit is further configured to send a timing advance T2 to the at least one UE, where the timing advance T2 is a timing advance of time of sending an uplink signal against time of arrival of a corresponding downlink signal at the UE, where the uplink signal is sent by the at least one UE to a apparatus, and the corresponding downlink signal is sent by the apparatus to the at least one UE.

Further, the receiving unit is further configured to receive a timing advance sent by the at least one UE or the first node, where the timing advance is determined by the at least one UE according to at least the timing advance T2, a timing advance T1 determined by the first node, a moment of receiving a downlink message of the first node by the at least one UE, and a moment of receiving the downlink message of the apparatus by the at least one UE.

The synchronizing unit is specifically configured to: adjust transmitting time according to the timing offset, and implement the synchronization with the first node.

Optionally, if the receiving unit receives at least two timing offsets sent by the at least one UE or the first node, the apparatus further includes:

a calculating unit, configured to: perform a mathematical operation according to the received at least two timing offsets, and use an operation result as a timing offset for the apparatus to adjust the transmitting time.

Further, the apparatus further includes:

a judging unit, configured to determine whether a current synchronization offset state exceeds a set threshold; and when the judging unit determines that the current synchronization offset state exceeds the set threshold, the sending unit is further configured to send synchronization request information to the first node.

According to a sixth aspect, a node synchronization apparatus is provided, including:

a receiving unit, configured to receive a notification message sent by a first node, where the notification message is used to instruct a apparatus to assist a second node to implement synchronization with a first node;

a calculating unit, configured to calculate a timing offset between the first node and the second node; and a sending unit, configured to send the timing offset to the first node or the second node.

In a first possible implementation manner, the receiving unit is further configured to receive a downlink message sent by the first node;

the sending unit is further configured to send a random access message to the first node; and the receiving unit is further configured to receive a timing advance T1 sent by the first node, where the timing advance T1 is a timing advance of time of sending an uplink signal against time of arrival of a corresponding downlink signal at the apparatus, where the uplink signal is sent by the apparatus to the first node, and the corresponding downlink signal is sent by the first node to the apparatus.

Further, the receiving unit is further configured to receive a downlink message sent by the second node;

the sending unit is further configured to send a random access message to the second node; and the receiving unit is further configured to receive a timing advance T2 sent by the second node, where the timing advance T2 is a timing advance of time of sending an uplink signal against time of arrival of a corresponding downlink signal at the UE, where the uplink signal is sent by the UE to the second node, and the corresponding downlink signal is sent by the second node to the apparatus.

The calculating unit is specifically configured to calculate the timing offset according to at least a moment t1 of receiving the downlink message sent by the first node, a moment t2 of receiving the downlink message sent by the second node, the timing advance T1, and the timing advance T2.

The calculating unit is further specifically configured to use a formula $$\Delta T = \left(t2 - t1 - \frac{T2 - T1}{2}\right) \text{ or } \Delta T = \pm\left(t2 - t1 - \frac{T2 - T1}{2}\right)$$

to calculate the timing offset of the second node, where $\Delta T$ is the timing offset.

According to a seventh aspect, a node is provided, including:

a processor, configured to select at least one user equipment UE, where the at least one UE is used to assist a second node to synchronize with the node; and a sender, configured to send a notification message to the at least one UE, so that the at least one UE assists the second node to implement synchronization with the node.

In a first possible implementation manner, the sender is further configured to send a downlink message to the at least one UE, and the node further includes:

a receiver, configured to receive a random access message sent by the at least one UE; and the sender is further configured to send a timing advance T1 to the at least one UE, where the timing advance T1 is a timing advance of time of sending an uplink signal against time of arrival of a corresponding downlink signal at the UE, where the uplink signal is sent by the at least one UE to the node, and the corresponding downlink signal is sent by the node to the at least one UE.

Further, the receiver is further configured to receive synchronization request information sent by the second node.

The processor is specifically configured to select, among UEs in coverage according to reference signal received powers RSRPs of the UEs from the second node, a UE on which a power of a reference signal received from the second node is greater than a first preset value, where the RSRPs are sent by the UEs in the coverage; or select, among UEs in coverage according to reference signal received powers RSRPs of the UEs from the node, a UE on which a power of a reference signal received from the node is greater than a second preset value, where the RSRPs are sent by the UEs in the coverage; or select, among UEs in coverage according to reference signal received powers RSRPs of the UEs from the node and the second node, a UE on which a power of a reference signal received from the second node is greater than a first preset value and on which a power of a reference signal received from the node is greater than a second preset value, where the RSRPs are sent by the UEs in the coverage.

Further, the sender is further configured to send random access signal sequence information or synchronization-assisting specific signal sequence information to the at least one UE, where the random access signal sequence information or the synchronization-assisting specific signal sequence information is used for the UE to assist the second node to synchronize with the node.

The sender is further configured to send identification information of the at least one UE and/or random access signal sequence information or synchronization-assisting specific signal sequence information to the second node, so that the second node determines the at least one UE according to the identification information and/or the random access signal sequence information or the synchronization-assisting specific signal sequence information.

Further, the receiver is further configured to receive a timing offset sent by the at least one UE, where the timing offset is a downlink sending time offset between the second node and the node.

The timing offset is determined by the at least one UE according to at least the timing advance T1, a timing advance T2 determined by the second node, a moment of receiving the downlink message of the node by the at least one UE, and a moment of receiving a downlink message of the second node by the at least one UE.

Further, the sender is further configured to send the timing offset to the second node.

According to an eighth aspect, a node is provided, including:

a receiver, configured to receive identification information of at least one user equipment UE or random access signal sequence information sent by a first node; and a processor, configured to determine the at least one UE according to the identification information of the at least one UE or the random access signal sequence information; and configured to implement synchronization with the first node by using the determined at least one UE.

In a first possible implementation manner, the node further includes:

a sender, configured to send synchronization request information to the first node.

Further, the sender is further configured to send a downlink message to the at least one UE, and therefore, the receiver is further configured to receive a random access message sent by the at least one UE; and the sender is further configured to send a timing advance T2 to the at least one UE, where the timing advance T2 is a timing advance of time of sending an uplink signal against time of arrival of a corresponding downlink signal at the UE, where the uplink signal is sent by the at least one UE to the node, and the corresponding downlink signal is sent by the node to the at least one UE.

Further, the receiver is further configured to receive a timing advance sent by the at least one UE or the first node, where the timing advance is determined by the at least one UE according to at least the timing advance T2, a timing advance T1 determined by the first node, a moment of receiving a downlink message of the first node by the at least one UE, and a moment of receiving the downlink message of the node by the at least one UE.

The processor is specifically configured to: adjust transmitting time according to the timing offset, and implement the synchronization with the first node.

Optionally, when the receiver receives at least two timing offsets sent by the at least one UE or the first node, the processor is further configured to:

perform a mathematical operation according to the received at least two timing offsets, and use an operation result as a timing offset for the node to adjust the transmitting time.

Further, the processor is further configured to:

determine whether a current synchronization offset state exceeds a set threshold; and when the processor determines that the current synchronization offset state exceeds the set threshold, the sender is further configured to send synchronization request information to the first node.

According to a ninth aspect, user equipment is provided, including:

a receiver, configured to receive a notification message sent by a first node, where the notification message is used to instruct the user equipment UE to assist a second node to implement synchronization with a first node;

a processor, configured to calculate a timing offset between the first node and the second node; and a sender, configured to send the timing offset to the first node or the second node.

In a first possible implementation manner, the receiver is further configured to receive a downlink message sent by the first node;

the sender is further configured to send a random access message to the first node; and the receiver is further configured to receive a timing advance T1 sent by the first node, where the timing advance T1 is a timing advance of time of sending an uplink signal against time of arrival of a corresponding downlink signal at the UE, where the uplink signal is sent by the UE to the first node, and the corresponding downlink signal is sent by the first node to the UE.

Further, the receiver is further configured to receive a downlink message sent by the second node;

the sender is further configured to send a random access message to the second node; and the receiver is further configured to receive a timing advance T2 sent by the second node, where the timing advance T2 is a timing advance of time of sending an uplink signal against time of arrival of a corresponding downlink signal at the UE, where the uplink signal is sent by the UE to the second node, and the corresponding downlink signal is sent by the second node to the UE.

The processor is specifically configured to calculate the timing offset according to at least a moment t1 of receiving the downlink message sent by the first node, a moment t2 of receiving the downlink message sent by the second node, the timing advance T1, and the timing advance T2.

The processor is further specifically configured to use a formula $$\Delta T = \left(t2 - t1 - \frac{T2-T1}{2}\right) \text{ or } \Delta T = \pm\left(t2 - t1 - \frac{T2-T1}{2}\right)$$

to calculate the timing offset of the second node, where $\Delta T$ is the timing offset.

According to a tenth aspect, a node synchronization method is provided, including:

receiving, by a second node, a synchronization-assisting specific signal sent by at least one UE;

calculating, by the second node, a timing offset between the second node and a first node according to a moment T3 of receiving the synchronization-assisting specific signal and a moment T4 of sending a downlink message to the at least one UE by the second node; and implementing, by the second node, synchronization with the first node according to the timing offset.

In a first possible implementation manner of the tenth aspect, before the receiving, by a second node, a synchronization-assisting specific signal sent by at least one UE, the method further includes: receiving, by the second node, identification information of the at least one user equipment UE and/or synchronization-assisting specific signal sequence information sent by the first node; and determining, by the second node, the at least one UE according to the identification information of the at least one UE and/or the synchronization-assisting specific signal sequence information.

before the receiving, by a second node, a synchronization-assisting specific signal sent by at least one UE, the method further includes: sending, by the second node, a downlink signal to the at least one UE, where the downlink signal is used to indicate sequence information and/or sending resource information of the synchronization-assisting specific signal sent by the at least one UE.

The calculating, by the second node, a timing offset between the second node and a first node according to a moment T3 of receiving the synchronization-assisting specific signal and a moment T4 of sending a downlink message to the at least one UE includes: using a formula $$\Delta T = \left(\frac{T3-T4}{2}\right) \text{ or } \Delta T = -\left(\frac{T3-T4}{2}\right)$$

to calculate the timing offset, where $\Delta T$ is the timing offset.

Further, the method further includes: determining, by the second node, whether a current synchronization offset state exceeds a set threshold; and sending, by the second node, synchronization request information to the first node if the current synchronization offset state exceeds the set threshold.

With reference to the first possible implementation manner of the tenth aspect, in a second possible implementation manner of the tenth aspect, if the second node obtains at least two timing offsets by means of calculation, before the implementing, by the second node, synchronization with the first node according to the timing offset, the method further includes:

performing, by the second node, a mathematical operation according to the at least two timing offsets, and using an operation result as a timing offset for the second node to adjust transmitting time.

With reference to the first possible implementation manner of the tenth aspect and the second possible implementation manner of the tenth aspect, in a third possible implementation manner of the tenth aspect, the implementing, by the second node, synchronization with the first node according to the timing offset includes: adjusting, by the second node, the transmitting time according to the timing offset, and implementing the synchronization with the first node.

According to an eleventh aspect, a node synchronization method is provided, including:

receiving, by user equipment UE, a downlink message sent by a first node, where the downlink message is used to assist a second node to synchronize with the first node;

receiving, by the UE, a downlink message sent by the second node, where the downlink message is used to assist the second node to synchronize with the first node;

calculating, by the UE, a timing advance T5 according to a moment of sending the downlink message by the first node and a moment of receiving, by the UE, the downlink message sent by the second node; and sending, by the UE, a synchronization-assisting specific signal to the second node according to the timing advance T5, so that the second node implements synchronization with the first node according to the synchronization-assisting specific signal.

In a first possible implementation manner of the eleventh aspect, before the calculating a timing advance T5, the method further includes: receiving, by the UE, a notification message sent by the first node, where the notification message is used to instruct the UE to assist the second node to implement synchronization with the first node.

The calculating a timing advance T5 includes: using the following formula to calculate the timing advance T5: $T5=t2-T_0$, where t2 is the moment of receiving, by the UE, the downlink message sent by the second node, and $T_0$ is the moment of sending the downlink message by the first node.

With reference to the first possible implementation manner of the eleventh aspect, in a second possible implementation manner, before the calculating a timing advance T5, the method further includes:

sending, by the UE, a random access message to the first node according to the received downlink message sent by the first node; and receiving, by the UE, a timing advance T1 sent by the first node, where the timing advance T1 is a timing advance of time of sending an uplink signal against time of arrival of a corresponding downlink signal at the UE, where the uplink signal is sent by the UE to the first node, and the corresponding downlink signal is sent by the first node to the UE.

The moment $T_0$ of sending the downlink message by the first node is obtained by means of calculation according to the following formula:

$$T_0 = t1 - \frac{T1}{2},$$

where t1 is a moment of receiving, by the UE, the downlink message sent by the first node.

With reference to the eleventh aspect, the first possible implementation manner of the eleventh aspect and the second possible implementation manner of the eleventh aspect, in a third possible implementation manner of the eleventh aspect, the timing advance T5 is a timing advance of time of sending the synchronization-assisting specific signal against time of sending the downlink message, where the synchronization-assisting specific signal is sent by the UE to the second node, and the downlink message is sent by the first node to the UE.

the synchronization-assisting specific signal is a signal of multiplexing a sequence of a random access signal, and the synchronization-assisting specific signal is sent on a time resource and/or a frequency resource different from that of the random access signal; or the synchronization-assisting specific signal is a signal different from the random access signal, where the synchronization-assisting specific signal includes identification information of the second node.

According to a twelfth aspect, a node synchronization apparatus is provided, including:

a sending unit, configured to send a downlink message to at least one user equipment UE;

a receiving unit, configured to receive a synchronization-assisting specific signal sent by the at least one UE;

a calculating unit, configured to calculate a timing offset between a apparatus and a first node according to a moment T3 of receiving the synchronization-assisting specific signal and a moment T4 of sending the downlink message to the at least one UE by the apparatus; and a synchronizing unit, configured to implement synchronization with the first node according to the timing offset.

In a first possible implementation manner, the receiving unit is further configured to receive identification information of the at least one user equipment UE or synchronization-assisting specific signal sequence information sent by the first node, and the apparatus further includes:

a determining unit, configured to determine the at least one UE according to the identification information of the at least one UE or the synchronization-assisting specific signal sequence information.

Further, the sending unit is further configured to send a downlink signal to the at least one UE, where the downlink signal is used to indicate sequence information and/or sending resource information of the synchronization-assisting specific signal sent by the at least one UE.

The calculating unit is specifically configured to: use a formula $$\Delta T = \left(\frac{T3-T4}{2}\right) \text{ or } \Delta T = -\left(\frac{T3-T4}{2}\right)$$

to calculate the timing offset, where $\Delta T$ is the timing offset.

With reference to the first possible implementation manner of the twelfth aspect, in a second possible implementation manner, the calculating unit is further configured to:

when at least two timing offsets are obtained by means of calculation, perform a mathematical operation according to the at least two timing offsets and use an operation result as a timing offset for the apparatus to adjust transmitting time.

With reference to the twelfth aspect, the first possible implementation manner of the twelfth aspect and the second possible implementation manner of the twelfth aspect, in a third possible implementation manner, the synchronizing unit is specifically configured to:

adjust the transmitting time according to the timing offset, and implement the synchronization with the first node.

Further, the apparatus further includes:

a judging unit, configured to determine whether a current synchronization offset state exceeds a set threshold; and when the judging unit determines that the current synchronization offset state exceeds the set threshold, the sending unit is further configured to send synchronization request information to the first node.

According to a thirteenth aspect, a node synchronization apparatus is provided, including:

a receiving unit, configured to receive a downlink message sent by a first node, where the downlink message is used to assist a second node to synchronize with the first node; and configured to receive a downlink message sent by the second node, where the downlink message is used to assist the second node to synchronize with the first node;

a calculating unit, configured to calculate a timing advance T5 according to a moment of sending the downlink message by the first node and a moment of receiving the downlink message sent by the second node; and a sending unit, configured to send a synchronization-assisting specific signal to the second node according to the timing advance T5, so that the second node implements synchronization with the first node according to the synchronization-assisting specific signal.

In a first possible implementation manner, the apparatus further includes:

a receiving unit, configured to receive a notification message sent by the first node, where the notification message is used to instruct the apparatus to assist the second node to implement synchronization with a first node.

The calculating unit is specifically configured to:

use the following formula to calculate the timing advance T5: $T5=t2-T_0$, where $t2$ is the moment of receiving, by the apparatus, the downlink message sent by the second node, and $T_0$ is the moment of sending the downlink message by the first node.

With reference to the first possible implementation manner of the thirteenth aspect, in a second possible implementation manner, the sending unit is further configured to send a random access message to the first node according to the received downlink message sent by the first node; and the receiving unit is further configured to receive a timing advance T1 sent by the first node, where the timing advance T1 is a timing advance of time of sending an uplink signal against time of arrival of a corresponding downlink signal at the apparatus, where the uplink signal is sent by the apparatus to the first node, and the corresponding downlink signal is sent by the first node to at least one apparatus.

According to a fourteenth aspect, a node is provided, including:

a receiver, configured to receive a synchronization-assisting specific signal sent by at least one UE; and a processor, configured to calculate a timing offset between the node and a first node according to a moment T3 of receiving the synchronization-assisting specific signal and a moment T4 of sending the downlink message to the at least one UE by the node; and configured to implement synchronization with the first node according to the timing offset.

In a first possible implementation manner, the receiver is further configured to receive identification information of the at least one user equipment UE or synchronization-assisting specific signal sequence information sent by the first node, and the processor is further configured to:

determine the at least one UE according to the identification information of the at least one UE or the synchronization-assisting specific signal sequence information.

Further, the node further includes:

a sender, configured to send a downlink signal to the at least one UE, where the downlink signal is used to indicate sequence information and/or sending resource information of the synchronization-assisting specific signal sent by the at least one UE.

The processor is specifically configured to:

use a formula $$\Delta T = \left(\frac{T3-T4}{2}\right) \text{ or } \Delta T = -\left(\frac{T3-T4}{2}\right)$$

to calculate the timing offset, where $\Delta T$ is the timing offset.

With reference to the first possible implementation manner of the fourteenth aspect, in a second possible implementation manner, the processor is further configured to:

when at least two timing offsets are obtained by means of calculation, perform a mathematical operation according to the at least two timing offsets and use an operation result as a timing offset for the node to adjust the transmitting time.

With reference to the fourteenth aspect, the first possible implementation manner of the fourteenth aspect and the second possible implementation manner of the fourteenth aspect, in a third possible implementation manner, the processor is further specifically configured to:

adjust the transmitting time according to the timing offset, and implement the synchronization with the first node.

Further, the processor is further configured to:

determine whether a current synchronization offset state exceeds a set threshold; and when the processor determines that the current synchronization offset state exceeds the set threshold, the sender is further configured to send synchronization request information to the first node.

According to a fifteenth aspect, user equipment is provided, including:

a receiver, configured to receive a downlink message sent by a first node, where the downlink message is used to assist a second node to synchronize with the first node; and configured to receive a downlink message sent by the second node, where the downlink message is used to assist the second node to synchronize with the first node;

a processor, configured to calculate a timing advance T5 according to a moment of sending the downlink message by the first node and a moment of receiving, by the UE, the downlink message sent by the second node; and a sender, configured to send a synchronization-assisting specific signal to the second node according to the timing advance T5, so that the second node implements synchronization with the first node according to the synchronization-assisting specific signal.

In a first possible implementation manner, the user equipment further includes:

a receiver, configured to receive a notification message sent by the first node, where the notification message is used to instruct the UE to assist the second node to implement synchronization with a first node, where the processor is specifically configured to use the following formula to calculate the timing advance T5: $T5=t2-T_0$, where $t2$ is the moment of receiving, by the UE, the downlink message sent by the second node, and $T_0$ is the moment of sending the downlink message by the first node.

With reference to the first possible implementation manner of the fifteenth aspect, in a second possible implementation manner, the sender is further configured to send a random access message to the first node according to the received downlink message sent by the first node; and the receiver is further configured to receive a timing advance T1 sent by the first node, where the timing advance T1 is a timing advance of time of sending an uplink signal against time of arrival of a corresponding downlink signal at the UE, where the uplink signal is sent by the UE to the first node, and the corresponding downlink signal is sent by the first node to the UE.

According to a sixteenth aspect, a communications system is provided, including: the node according to the seventh aspect, the node according to the eighth aspect, and the user equipment according to the ninth aspect; or the node according to the seventh aspect, the node according to the fourteenth aspect, and the user equipment according to the fifteenth aspect.

In comparison with the prior art, in the embodiments of the present disclosure, first, a first node selects one or more UEs among user equipments UEs that simultaneously interact with the first node and a second node, where the first node is a synchronization source node that is already synchronized, and the second node is a to-be-synchronized node. By interacting with the selected UE, the first node obtains a timing advance of sending, by the UE, an uplink signal to the first node, and sends the timing advance to the UE; the second node receives a notification message of the first node, and determines the UE selected by the first node; afterwards, two branch processes are to be performed. In a first branch process, the second node interacts with the determined UE to obtain a timing advance of sending, by the UE, an uplink signal to the second node, and sends the timing advance to the UE; the UE calculates a timing offset of the second node according to the two timing advances and moments of sending downlink messages to the UE by the first node and the second node; and the second node adjusts transmitting time according to the timing offset obtained by the UE by means of calculation. In a second branch process, according to a moment of receiving a downlink message of the second node and the timing advance sent by the first node, the UE calculates a timing advance of sending a synchronization-assisting specific signal to the second node, so that the second node calculates a timing offset according to a moment of receiving the specific signal and a moment of sending a downlink signal to the UE, and adjusts the transmitting time according to the obtained timing offset by means of calculation. A problem that time synchronization cannot be implemented in the prior art because a to-be-synchronized node is unable to receive a synchronization signal sent by a synchronization source node is resolved, and time synchronization for the to-be-synchronized node on a basis of an existing node device is implemented, reducing usage costs, and improving network operation efficiency.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

Figure 1:
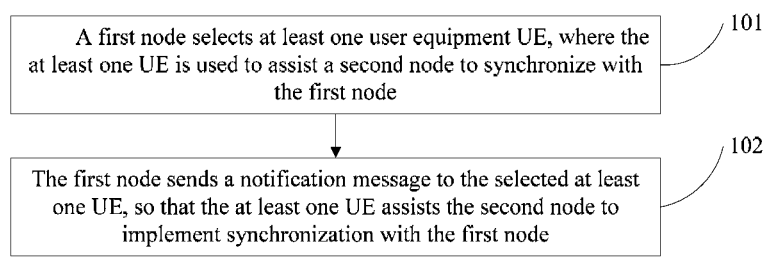
FIG. 1 is a method flowchart according to an embodiment of the present disclosure.

An embodiment of the present disclosure provides a node synchronization method, which is applied to a first node, a second node, and user equipment UE, where the first node interacts respectively with the second node and the UE. As shown in FIG. 1, the method includes:

101. The first node selects at least one user equipment UE, where the at least one UE is used to assist the second node to synchronize with the first node.

For example, the selecting at least one user equipment UE includes: selecting, by the first node among UEs in coverage according to RSRPs (Reference Signal Received Power) of the UEs from the second node, a UE on which a power of a reference signal received from the second node is greater than a first preset value, where the RSRPs are sent by the UEs in the coverage; or selecting, by the first node among UEs in coverage according to reference signal received powers RSRPs of the UEs from the first node, a UE on which a power of a reference signal received from the first node is greater than a second preset value, where the RSRPs are sent by the UEs in the coverage; or selecting, by the first node among UEs in coverage according to reference signal received powers RSRPs of the UEs from the first node and the second node, a UE on which a power of a reference signal received from the second node is greater than a first preset value and on which a power of a reference signal received from the first node is greater than a second preset value, where the RSRPs are sent by the UEs in the coverage, where the first preset value is set according to a received power that exists when the UE receives a reference signal from the second node, and the second preset value is set according to a received power that exists when the UE receives a reference signal from the first node.

Further, before the selecting at least one user equipment UE, the method further includes: sending, by the first node, random access signal sequence information or synchronization-assisting specific signal sequence information to the at least one UE, where the random access signal sequence information or the synchronization-assisting specific signal sequence information is used for the UE to assist the second node to synchronize with the first node.

Further, before the selecting at least one user equipment UE, the method further includes: receiving, by the first node, synchronization request information sent by the second node.

The synchronization request information may be sent when the second node is initially deployed, or sent when the second node determines that a time synchronization offset of the second node exceeds a threshold.

Further, after the selecting at least one user equipment UE, the method further includes:

sending, by the first node, identification information of the at least one UE and/or random access signal sequence information or synchronization-assisting specific signal sequence information to the second node, so that the second node determines the at least one UE according to the identification information and/or the random access signal sequence information or the synchronization-assisting specific signal sequence information.

102. The first node sends a notification message to the selected at least one UE, so that the at least one UE assists the second node to implement synchronization with the first node.

Further, before the sending, by the first node, a notification message to the at least one UE, the method further includes: sending, by the first node, a downlink message to the at least one UE; receiving, by the first node, a random access message sent by the at least one UE; and sending, by the first node, a timing advance T1 to the at least one UE, where the timing advance T1 is a timing advance of time of sending an uplink signal against time of arrival of a corresponding downlink signal at the UE, where the uplink signal is sent by the at least one UE to the first node, and the corresponding downlink signal is sent by the first node to the at least one UE.

Optionally, after the sending, by the first node, a downlink message to the at least one UE, the method further includes: receiving, by the first node, a timing offset sent by the at least one UE, where the timing offset is a downlink sending time offset between the second node and the first node. For example, the timing offset is a time offset between a first subframe sent by the second node in a downlink direction and a second subframe sent by the first node in the downlink direction, where a subframe number of the first subframe is the same as a subframe number of the second subframe, or a subframe number of the first subframe correlates with a subframe number of the second subframe.

The timing offset is determined by the at least one UE according to at least the timing advance T1, a timing advance T2 determined by the second node, a moment of receiving the downlink message of the first node by the at least one UE, and a moment of receiving a downlink message of the second node by the at least one UE; and the first node sends the timing offset to the second node. It should be noted that a message between the second node and the first node may be transmitted in a wired or wireless backhaul manner by using an interface, such as an X2 interface, between the two nodes.

In comparison with the prior art, in this embodiment of the present disclosure, a first node selects at least one user equipment UE; the first node determines a timing advance T1 applied when the UE sends an uplink signal to the first node; the first node sends the timing advance T1 to the UE, so that the UE uses parameters that include the timing advance T1 to calculate a timing offset between the first node and a second node and sends the timing offset to the second node, or so that the UE sends a synchronization-assisting specific signal to a second node according to the timing advance T1, and the second node calculates a timing offset according to the specific signal, and therefore, the second node performs time synchronization by using the received timing offset or the obtained timing offset by means of calculation, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 2:
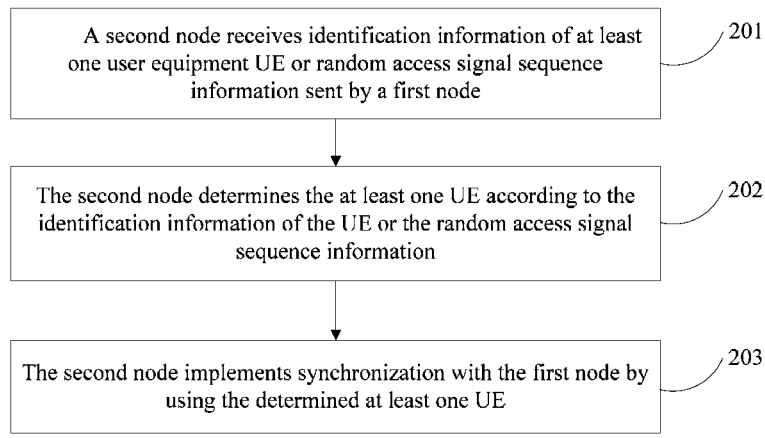
FIG. 2 is a method flowchart according to another embodiment of the present disclosure.

Another embodiment of the present disclosure provides a node synchronization method, which is applied to a first node, a second node, and user equipment UE, where the second node interacts with the first node and the UE. As shown in FIG. 2, the method includes:

201. The second node receives identification information of at least one user equipment UE or random access signal sequence information sent by the first node.

The identification information of the at least one UE or the random access signal sequence information may be transmitted in a wired or wireless backhaul manner.

Further, before the receiving, by the second node, identification information of at least one user equipment UE or random access signal sequence information sent by the first node, the method further includes:

sending, by the second node, synchronization request information to the first node. The synchronization request information may be sent when the second node is initially deployed, or sent when the second node determines that a time synchronization offset of the second node exceeds a threshold.

202. The second node determines the at least one UE according to the identification information of the UE or the random access signal sequence information.

Further, before step 203 is performed, the method further includes: sending, by the second node, a downlink message to the at least one UE; receiving, by the second node, a random access message sent by the at least one UE; and sending, by the second node, a timing advance T2 to the at least one UE, where the timing advance T2 is a timing advance of time of sending an uplink signal against time of arrival of a corresponding downlink signal at the UE, where the uplink signal is sent by the at least one UE to the second node, and the corresponding downlink signal is sent by the second node to the at least one UE.

203. The second node implements synchronization with the first node by using the determined at least one UE.

Specifically, the second node receives a timing advance sent by the at least one UE or the first node, where the timing advance is determined by the at least one UE according to at least the timing advance T2, a timing advance T1 determined by the first node, a moment of receiving a downlink message of the first node by the at least one UE, and a moment of receiving the downlink message of the second node by the at least one UE; and the second node adjusts transmitting time according to the timing offset, and implements the synchronization with the first node.

The timing offset may be transmitted in a wired or wireless backhaul manner.

Optionally, if the second node receives at least two timing offsets sent by the at least one UE or the first node, before the second node adjusts the transmitting time according to the timing offset, the method further includes: performing, by the second node, a mathematical operation according to the received at least two timing offsets, and using an operation result as the timing offset. For example, the mathematical operation includes: working out an arithmetic average, a weighted average, a geometric average, or the like, of the multiple timing offsets.

Further, the method further includes:

determining, by the second node, whether a current synchronization offset state exceeds a set threshold; and sending, by the second node, synchronization request information to the first node if the current synchronization offset state exceeds the set threshold.

It should be noted that a message between the second node and the first node may be transmitted in a wired or wireless backhaul manner by using an interface, such as an X2 interface, between the two nodes.

In comparison with the prior art, in this embodiment of the present disclosure, a second node determines one or more UEs according to information sent by a first node; the second node interacts with the UEs to determine a timing advance T2 applied when the UE sends an uplink signal to the second node; sends the timing advance T2 to the UE, so that the UE calculates a timing offset between the second node and the first node according to parameters such as the timing advance T2; and the second node receives the timing offset sent by the UE or the first node, and adjusts transmitting time according to the timing offset, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 3:
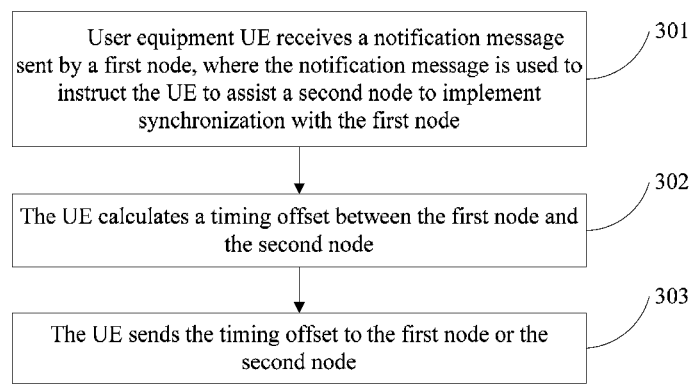
FIG. 3 is a method flowchart according to another embodiment of the present disclosure.

Another embodiment of the present disclosure provides a node synchronization method, which is applied to a first node, a second node, and user equipment UE, where the UE interacts respectively with the first node and the second node. As shown in FIG. 3, the method includes:

301. The user equipment UE receives a notification message sent by the first node, where the notification message is used to instruct the UE to assist the second node to implement synchronization with the first node.

Further, before step 302 is performed, the method further includes: receiving, by the UE, a downlink message sent by the first node;

sending, by the UE, a random access message to the first node; and receiving, by the UE, a timing advance T1 sent by the first node, where the timing advance T1 is a timing advance of time of sending an uplink signal against time of arrival of a corresponding downlink signal at the UE, where the uplink signal is sent by the UE to the first node, and the corresponding downlink signal is sent by the first node to the UE.

Further, before step 302 is performed, the method further includes: receiving, by the UE, a downlink message sent by the second node.

sending, by the UE, a random access message to the second node; and receiving, by the UE, a timing advance T2 sent by the second node, where the timing advance T2 is a timing advance of time of sending an uplink signal against time of arrival of a corresponding downlink signal at the UE, where the uplink signal is sent by the UE to the second node, and the corresponding downlink signal is sent by the second node to the UE.

302. The UE calculates a timing offset between the first node and the second node.

The UE calculates the timing offset according to at least a moment t1 of receiving the downlink message sent by the first node, a moment t2 of receiving the downlink message sent by the second node, the timing advance T1, and the timing advance T2. For example, a formula $$\Delta T = \left(t2 - t1 - \frac{T2 - T1}{2}\right) \text{ or } \Delta T = \pm\left(t2 - t1 - \frac{T2 - T1}{2}\right)$$

is used to calculate the timing offset of the second node, where $\Delta T$ is the timing offset. In the formula, $\pm$ means that the obtained timing offset by means of calculation may be used to adjust transmitting time forward, or used to adjust transmitting time backward, so that the second node is synchronized with the first node.

303. The UE sends the timing offset to the first node or the second node.

In comparison with the prior art, in this embodiment of the present disclosure, a UE receives a notification message sent by a first node, and starts to assist a second node to implement synchronization with the first node; the UE calculates a timing offset between the first node and the second node; and the UE sends the timing offset to the first node or the second node, so that the second node adjusts transmitting time according to the timing offset and implements time synchronization, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 4:
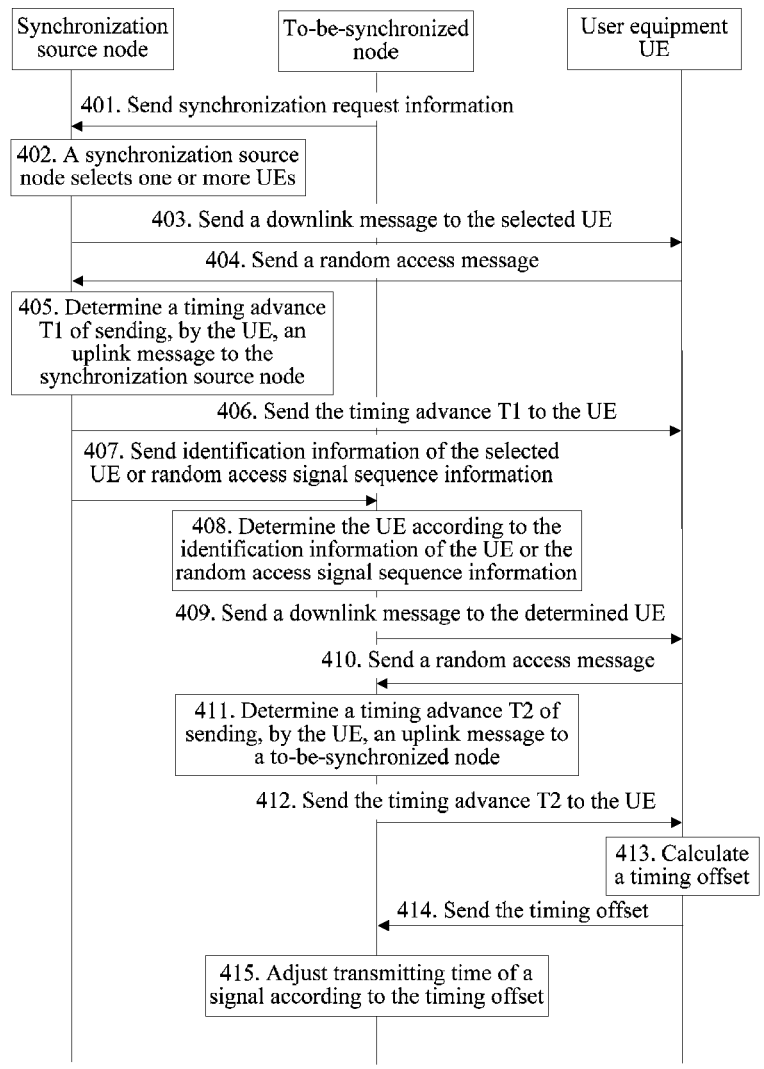
FIG. 4 is a method flowchart according to another embodiment of the present disclosure.

Another embodiment of the present disclosure provides a node synchronization method, which is applied to a to-be-synchronized node, a synchronization source node, and user equipment UE; the UE calculates a timing offset that needs to be adjusted for synchronizing the to-be-synchronized node, where the synchronization source node has implemented time synchronization. As shown in FIG. 4, the method includes:

401. The to-be-synchronized node sends synchronization request information to the synchronization source node.

The to-be-synchronized node and the synchronization source node are small cells deployed in indoor or outdoor hotspots. Time synchronization needs to be performed for the deployed small cells so as to improve network operation efficiency in a network deployment scenario. The synchronization source node has implemented the time synchronization, and serves as a reference node.

For example, the synchronization request information may be sent when the to-be-synchronized node is initially deployed. Alternatively, after the to-be-synchronized node performs the time synchronization, the to-be-synchronized node finds, by means of checking, that a synchronization clock offset of the to-be-synchronized node is relatively large and exceeds an acceptable threshold. In this case, the to-be-synchronized node sends synchronization request information to the synchronization source node again.

The synchronization request information may be transmitted in a wired or wireless backhaul manner.

402. The synchronization source node selects one or more UEs.

The synchronization source node performs the selection among UEs that are in signal coverage of both the synchronization source node and the to-be-synchronized node. Preferably, a UE with a relatively high received power of receiving reference signals of the to-be-synchronized node and the synchronization source node is selected. In this way, accuracy is higher when a timing offset between the to-be-synchronized node and the synchronization source node is calculated. For example, among the UEs in the coverage, a UE on which a power of a reference signal received from the to-be-synchronized node is greater than a first preset value is selected according to reference signal received powers RSRPs of the UEs from the to-be-synchronized node, where the RSRPs are sent by the UEs in the coverage; or among the UEs in the coverage, a UE on which a power of a reference signal received from the synchronization source node is greater than a second preset value is selected according to reference signal received powers RSRPs of the UEs from the synchronization source node, where the RSRPs are sent by the UEs in the coverage; or among the UEs in the coverage, a UE on which a power of a reference signal received from the to-be-synchronized node is greater than a first preset value and on which a power of a reference signal received from the synchronization source node is greater than a second preset value is selected according to reference signal received powers RSRPs of the UEs from the synchronization source node and the to-be-synchronized node, where the RSRPs are sent by the UEs in the coverage, where the first preset value is set according to a received power that exists when the UE receives a reference signal from the to-be-synchronized node, and the second preset value is set according to a received power that exists when the UE receives a reference signal from the synchronization source node.

403. The synchronization source node sends a downlink message to the selected UE.

404. After receiving the downlink message, the UE sends a random access message to the synchronization source node.

405. According to a moment of sending the downlink message and a moment of receiving the random access message, the synchronization source node determines a timing advance T1 of sending, by the UE, an uplink signal to the synchronization source node.

A node needs to simultaneously receive uplink signals sent by multiple UEs. To avoid intersymbol interference, the signals sent by all the UEs are generally required to arrive at the node at the same time. Therefore, the UE needs to adjust transmitting time of the uplink signal according to the node to ensure that the signal of the UE arrives at the node at an expected moment. For example, if a transmission distance of a signal between the UE and the node is D and the transmitting/receiving node expects to receive, at a moment $T_0$, the uplink signal sent by the UE, the UE needs to send the signal at a moment $T_0-T_A$, where $T_A$ means an advance of sending the signal by the UE. The value of $T_A$ is D/c, where c means transmission speed of electromagnetic waves.

Based on the foregoing principles, the synchronization source node sends a downlink signal at the moment $T_0$, and the UE receives the downlink signal at a moment t1 and sends a random access message at the same time. The synchronization source node receives the random access message at a moment t3. A difference between t1 and $T_0$ is equal to a difference between t3 and t1, and the difference is defined as t4. Therefore, the timing advance may be obtained: $T1=2t4=t3-T_0$.

406. The synchronization source node sends the timing advance T1 to the UE.

It should be noted that different UEs obtain different values of the timing advance T1. Herein, multiple timing advances T1 may be obtained according to a quantity of selected UEs.

407. The synchronization source node sends identification information of the selected UE and/or random access signal sequence information to the to-be-synchronized node.

The identification information or the random access signal sequence information may be transmitted in a wired or wireless backhaul manner by using an interface, such as an X2 interface, between the nodes.

It should be noted that step 407 may be performed immediately after step 402 is performed, and no strict sequence exists between step 407 and steps 403-406.

408. The to-be-synchronized node determines the UE according to the identification information of the UE and/or the random access signal sequence information.

409. The to-be-synchronized node sends a downlink message to the determined UE.

410. After receiving the downlink message, the UE sends a random access message to the to-be-synchronized node.

411. According to a moment of sending the downlink message and a moment of receiving the random access message, the to-be-synchronized node determines a timing advance T2 of sending, by the UE, an uplink signal to the to-be-synchronized node.

For example, the to-be-synchronized node sends a downlink signal at a moment t5, where a time interval between t5 and $T_0$ is the calculated timing offset between the to-be-synchronized node and the synchronization source node. The UE receives the downlink signal at the moment t2 and sends a random access message at the same time. The to-be-synchronized node receives the random access message at a moment t7. A difference between t6 and t5 is equal to a difference between t7 and t6, and the difference is defined as t8. Therefore, the timing advance may be obtained: T2=2t8=t7−t5.

412. The to-be-synchronized node sends the timing advance T2 to the UE.

It should be noted that different UEs obtain different values of the timing advance T2. Herein, multiple timing advances T2 may be obtained according to a quantity of determined UEs.

413. The UE calculates a timing offset between the to-be-synchronized node and the synchronization source node according to the received timing advance T1 and timing advance T2 as well as moments t2 and t6 of receiving downlink signals.

Figure 5:
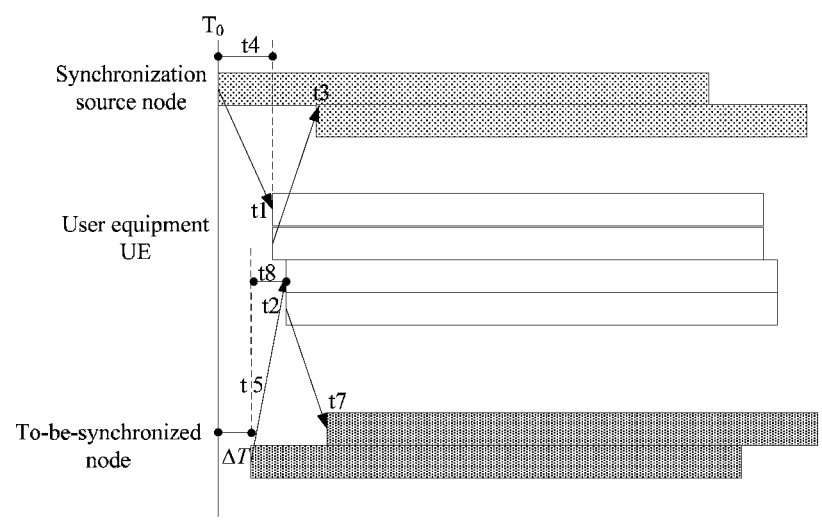
FIG. 5 is a schematic diagram of exchanging messages according to another embodiment of the present disclosure.

As shown in FIG. 5, FIG. 5 shows an entire process of interaction between the user equipment and the nodes in the foregoing steps. The process of calculating the timing offset is described with reference to FIG. 5. For example, according to T1 and t2, the UL may deduce $$T_0 = t1 - t4 = t1 - \frac{T1}{2};$$

according to T2 and t2, the UE may deduce $$t5 = t2 - t8 = t2 - \frac{T2}{2};$$

for the UE, T1, T2, t1, and t2 are all known, and therefore, the timing offset may be directly obtained by means of calculation:

$$\text{timing offset} = (t5 - T_0) = \left(t2 - t1 - \frac{T2 - T1}{2}\right), \text{ or}$$

$$\text{timing offset} = -(t5 - t1) = \pm\left(t6 - t2 - \frac{T2 - T1}{2}\right).$$

The timing offset obtained by means of calculation according to the foregoing two formulas may be used to adjust the transmitting time forward, or used to adjust the transmitting time backward, so that the to-be-synchronized node is synchronized with the synchronization source node.

Optionally, when the timing offset is calculated by using the foregoing two formulas, the timing offset may be additionally adjusted by using an integer multiple of a subframe length as an adjustment amount, so that the synchronization between the to-be-synchronized node and the synchronization source node is more accurate.

414. The UE sends the timing offset of the to-be-synchronized node to the to-be-synchronized node.

Optionally, the UE may also send the timing offset to the synchronization source node, and then the synchronization source node sends the timing offset to the to-be-synchronized node.

415. The to-be-synchronized node adjusts transmitting time of a signal according to the timing offset, and synchronizes with downlink sending of the synchronization source node.

Optionally, when the to-be-synchronized node receives multiple values of the timing offset, the values need to be processed to obtain an optimized value, and the optimized value is used as a final adjustment criterion. For example, a mathematical operation may be performed to work out an arithmetic average, a weighted average, or a geometric average of the multiple timing offsets. A specific optimization rule is not limited herein.

Alternatively, transmitting time of a signal of the synchronization source node may be adjusted so that downlink sending of the synchronization source node is synchronized with that of the to-be-synchronized node.

It should be noted that a message between the to-be-synchronized node and the synchronization source node may be transmitted in a wired or wireless backhaul manner by using an interface, such as an X2 interface, between the two nodes.

It should be noted that step 402 to step 415 may be performed periodically to keep adjusting the to-be-synchronized node and improve consistency of time synchronization between the to-be-synchronized node and the synchronization source node.

In comparison with the prior art, in this embodiment of the present disclosure, first, a synchronization source node selects one or more UEs among user equipments UEs that simultaneously interact with the synchronization source node and a to-be-synchronized node. By interacting with the selected UE, the synchronization source node obtains a timing advance of sending, by the UE, an uplink signal to the synchronization source node, and sends the timing advance to the UE; the to-be-synchronized node receives an indication message of the synchronization source node, and determines the UE selected by the synchronization source node; the to-be-synchronized node interacts with the determined UE to obtain a timing advance of sending, by the UE, an uplink signal to the to-be-synchronized node, and sends the timing advance to the UE; the UE calculates a timing offset between the to-be-synchronized node and the synchronization source node according to the two timing advances and moments of sending downlink messages to the UE by the synchronization source node and the to-be-synchronized node; and the to-be-synchronized node adjusts transmitting time according to the timing offset obtained by the UE by means of calculation, thereby solving a problem that time synchronization cannot be implemented in the prior art because the to-be-synchronized node is unable to receive a synchronization signal sent by the synchronization source node, performing time synchronization for the to-be-synchronized node on a basis of an existing node device, reducing usage costs, and improving network operation efficiency.

Figure 6:
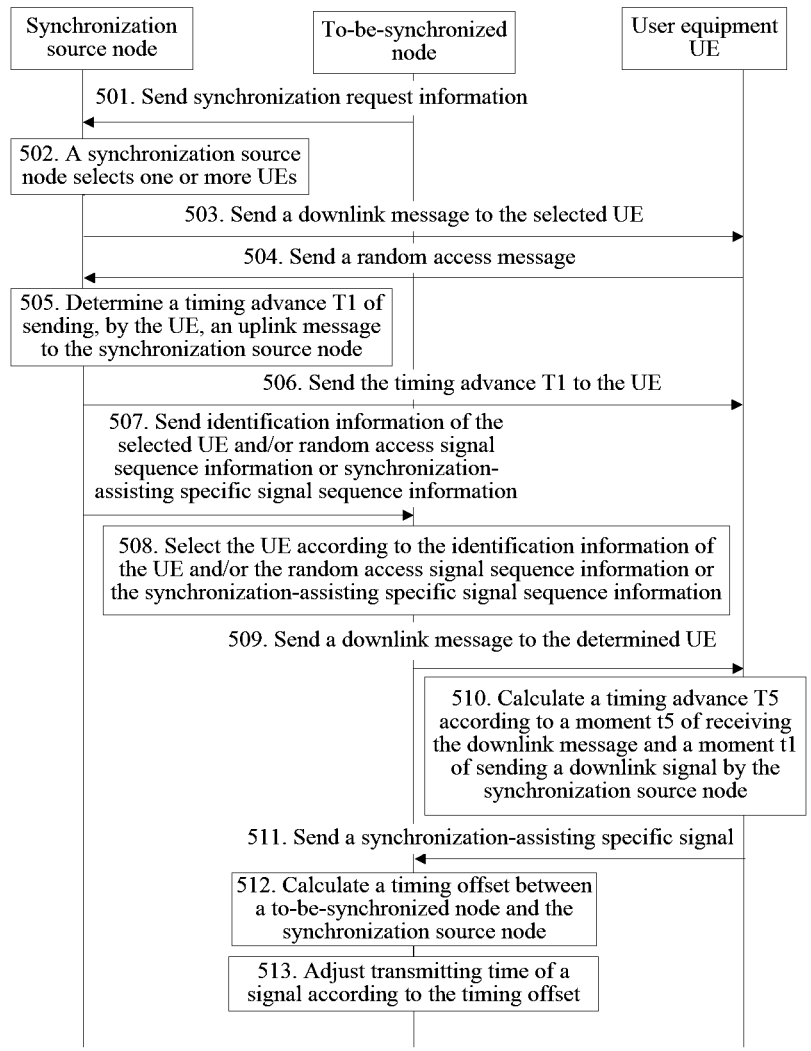
FIG. 6 is a method flowchart according to another embodiment of the present disclosure.

Another embodiment of the present disclosure provides a node synchronization method, which is applied to a to-be-synchronized node, a synchronization source node, and user equipment UE; on a to-be-synchronized node side, a timing offset that needs to be adjusted for synchronizing the to-be-synchronized node is calculated, where the synchronization source node has implemented time synchronization. As shown in FIG. 6, the method includes:

501. The to-be-synchronized node sends synchronization request information to the synchronization source node.

The to-be-synchronized node and the synchronization source node are small cells deployed in indoor or outdoor hotspots. Time synchronization needs to be performed for the deployed small cells in order to improve network operation efficiency in a network deployment scenario. The synchronization source node has implemented the time synchronization, and serves as a reference node.

For example, the synchronization request information may be sent when the to-be-synchronized node is initially deployed. Alternatively, after the to-be-synchronized node performs time synchronization, the to-be-synchronized node finds, by means of checking, that a synchronization clock offset of the to-be-synchronized node is relatively large and exceeds an acceptable threshold. In this case, the to-be-synchronized node sends synchronization request information to the synchronization source node again.

The synchronization request information may be transmitted in a wired or wireless backhaul manner.

Optionally, before synchronization of the to-be-synchronized node starts, not only the to-be-synchronized node may proactively send a synchronization request to the synchronization source node, but also the synchronization source node may trigger, periodically or according to a specific rule, a UE of the synchronization source node to synchronize the to-be-synchronized node. It should be noted that this embodiment does not limit a condition of triggering synchronization of the to-be-synchronized node, and any implementation manner that can fulfill a same objective as that of step 501 is applicable.

502. The synchronization source node selects one or more UEs.

The synchronization source node performs the selection among UEs that are in signal coverage of both the synchronization source node and the to-be-synchronized node. Preferably, a UE with a relatively high received power of receiving reference signals of the to-be-synchronized node and the synchronization source node is selected. In this way, accuracy is higher when a timing offset between the to-be-synchronized node and the synchronization source node is calculated. For example, among the UEs in the coverage, a UE on which a power of a reference signal received from the to-be-synchronized node is greater than a first preset value is selected according to reference signal received powers RSRPs of the UEs from the to-be-synchronized node, where the RSRPs are sent by the UEs in the coverage; or among the UEs in the coverage, a UE on which a power of a reference signal received from the synchronization source node is greater than a second preset value is selected according to reference signal received powers RSRPs of the UEs from the synchronization source node, where the RSRPs are sent by the UEs in the coverage; or among the UEs in the coverage, a UE on which a power of a reference signal received from the to-be-synchronized node is greater than a first preset value and on which a power of a reference signal received from the synchronization source node is greater than a second preset value is selected according to reference signal received powers RSRPs of the UEs from the synchronization source node and the to-be-synchronized node, where the RSRPs are sent by the UEs in the coverage, where the first preset value is set according to a received power that exists when the UE receives a reference signal from the second node, and the second preset value is set according to a received power that exists when the UE receives a reference signal from the first node.

503. The synchronization source node sends a downlink message to the selected UE.

504. After receiving the downlink message, the UE sends a random access message to the synchronization source node.

505. According to a moment of sending the downlink message and a moment of receiving the random access message, the synchronization source node determines a timing advance T1 of sending, by the UE, an uplink signal to the synchronization source node.

A node needs to simultaneously receive uplink signals sent by multiple UEs. To avoid intersymbol interference, the signals sent by all the UEs are generally required to arrive at the node at the same time. Therefore, the UE needs to adjust transmitting time of the uplink signal according to the node to ensure that the signal of the UE arrives at the node at an expected moment. For example, if a transmission distance of a signal between the UE and the node is D and the transmitting/receiving node expects to receive, at a moment $T_0$, the uplink signal sent by the UE, the UE needs to send the signal at a moment $T_0-T_A$, where $T_A$ means an advance of sending the signal by the UE. The value of $T_A$ is D/c, where c means transmission speed of electromagnetic waves.

Based on the foregoing principles, the synchronization source node sends a downlink signal at the moment $T_0$, and the UE receives the downlink signal at a moment t1 and sends a random access message at the same time. The synchronization source node receives the downlink signal at a moment t3. A difference between t1 and $T_0$ is equal to a difference between t3 and t1, and the difference is defined as t4. Therefore, the timing advance may be obtained: $T1=2t4=t3-T_0$.

506. The synchronization source node sends the timing advance T1 to the UE.

It should be noted that different UEs obtain different values of the timing advance T1. Herein, multiple timing advances T1 may be obtained according to a quantity of selected UEs.

507. The synchronization source node sends identification information of the selected UE and/or random access signal sequence information or synchronization-assisting specific signal sequence information to the to-be-synchronized node.

Optionally, when the synchronization source node exchanges the foregoing information with the to-be-synchronized node, the synchronization source node may send the identification information of the selected UE and/or the random access signal sequence information or the synchronization-assisting specific signal sequence information to a synchronization-assisting UE in a broadcast manner, and then send them to the to-be-synchronized node by using the UE.

The identification information and/or the random access signal sequence information may be transmitted in a wired or wireless backhaul manner by using an interface, such as an X2 interface, between the nodes.

It should be noted that step 507 may be performed immediately after step 502 is performed, and no strict sequence exists between step 507 and steps 503-506.

508. The to-be-synchronized node selects the UE according to the identification information of the UE and/or the random access signal sequence information or the synchronization-assisting specific signal sequence information.

509. The to-be-synchronized node sends a downlink message to the determined UE.

510. After receiving the downlink message, the UE calculates a timing advance T5 according to a moment t5 of receiving the downlink message and a moment t1 of sending a downlink signal by the synchronization source node.

The timing advance T5 is a timing advance of time of sending a synchronization-assisting specific signal against the time of sending the downlink message, where the synchronization-assisting specific signal is sent by the UE to the second node, and the downlink signal is sent by the first node to the UE. For example, the timing advance $T5=t2-T_0$, where $T_0$ may be obtained by means of calculation according to the moment t1 of receiving, by the UE, the downlink signal sent by the synchronization source node and the timing advance T1: $T_0=t1-T1/2=t1-t4$.

It should be noted that the synchronization-assisting specific signal is a signal of multiplexing a sequence of a random access signal, and the synchronization-assisting specific signal is sent on a time resource and/or a frequency resource different from that of the random access signal; or the synchronization-assisting specific signal is a signal different from the random access signal.

Optionally, to enable the to-be-synchronized node to detect the specific signal, the UE may use a maximum transmit power of the UE for transmitting when transmitting the specific signal; or, the UE estimates the transmit power of the specific signal according to strength of a signal received from the to-be-synchronized node, so as to ensure that the specific signal can be detected by the to-be-synchronized node.

Further, the synchronization-assisting specific signal includes identification information of the to-be-synchronized node.

511. The UE sends a synchronization-assisting specific signal to the to-be-synchronized node at a moment that is T5 ahead of the moment $T_0$.

Optionally, for a specific UE, when a synchronization-assisting specific signal is sent to the to-be-synchronized node, the signal may be sent at a moment that is T5−M ahead of $T_0$, where M is a fixed value, and may be configured for the specific UE by using the synchronization source node or another node. In addition, the value of M needs to be configured for the to-be-synchronized node by using a network-side device, and is used for calculating the timing offset.

It should be noted that the timing advance T5 may cause the specific signal to deviate from a receiving window of the to-be-synchronized node, the to-be-synchronized node may be unable to receive the specific signal, and the specific signal may fall within a receiving window of another node and interfere with the another node. Therefore, an M value may be configured herein so that a time advance of transmitting the specific signal can be adjusted according to receiving conditions of the to-be-synchronized node to reduce a probability of occurrence of the foregoing scenario.

512. According to a moment T3 of receiving the specific signal and a moment T4 of sending the downlink message to the UE, the to-be-synchronized node calculates a timing offset between the to-be-synchronized node and the synchronization source node.

Figure 7:
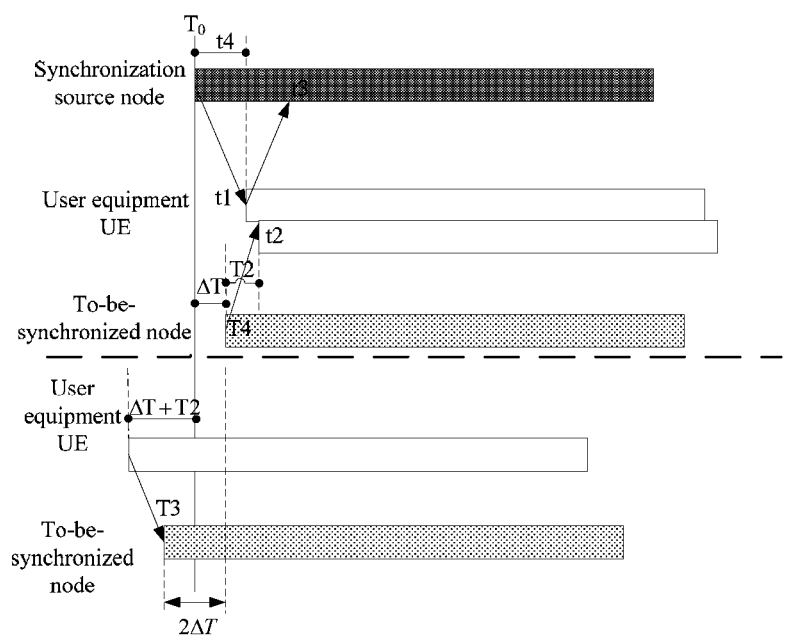
FIG. 7 is a schematic diagram of exchanging messages according to another embodiment of the present disclosure.

As shown in FIG. 7, the FIG. 7 shows an entire process of interaction between the user equipment and the nodes in the foregoing steps. The process of calculating the timing offset is described with reference to FIG. 7. For example, a value of the timing offset between the to-be-synchronized node and the synchronization source node is defined as ΔT, where ΔT is a difference between the moment $T_0$ of sending the downlink message to the UE by the synchronization source node in step 503 and the moment T4 of sending the downlink message to the UE by the to-be-synchronized node in step 509. It can be seen from FIG. 7 that a difference between the moment t2 of receiving, by the UE, the downlink message sent by the to-be-synchronized node and the moment $T_0$ is ΔT+T2, where T2 is a transmission time period consumed in a process that starts when the to-be-synchronized node sends the downlink message to the UE and ends when the downlink message arrives at the UE. Therefore, it can be learned that the time advance of sending the specific signal to the to-be-synchronized node in step 511 is ΔT+T2, and the time period consumed in the transmission process of the specific signal is T2. That is, the to-be-synchronized node receives the specific signal after a time period of T2. It can be seen from FIG. 7 that a difference between the moment T3 of receiving the specific signal by the to-be-synchronized node and the moment T4 of sending the downlink message to the UE by the to-be-synchronized node is double ΔT; and additionally, for the to-be-synchronized node, both T3 and T4 are known, and therefore, the timing offset is obtained by means of calculation:

$$\Delta T = \left(\frac{T3-T4}{2}\right) \text{ or } \Delta T = -\left(\frac{T3-T4}{2}\right),$$

where the timing offset obtained by means of calculation according to the foregoing two formulas may be used to adjust the transmitting time forward, or used to adjust the transmitting time backward, so that the to-be-synchronized node is synchronized with the synchronization source node.

Optionally, when the timing offset is calculated by using the foregoing two formulas, the timing offset may be additionally adjusted by using an integer multiple of a subframe length as an adjustment amount, so that the synchronization between the to-be-synchronized node and the synchronization source node is more accurate.

513. The to-be-synchronized node adjusts transmitting time of a signal according to the timing offset, and synchronizes with downlink sending of the synchronization source node.

Optionally, when the to-be-synchronized node receives multiple values of the timing offset, the values need to be processed to obtain an optimized value, and the optimized value is used as a final adjustment criterion. For example, a mathematical operation may be performed to work out an arithmetic average, a weighted average, or a geometric average of the multiple timing offsets. A specific optimization rule is not limited herein.

Alternatively, transmitting time of a signal of the synchronization source node may be adjusted so that downlink sending of the synchronization source node is synchronized with that of the to-be-synchronized node.

It should be noted that a message between the to-be-synchronized node and the synchronization source node may be transmitted in a wired or wireless backhaul manner by using an interface, such as an X2 interface, between the two nodes.

It should be noted that step 502 to step 513 may be performed periodically to keep adjusting the to-be-synchronized node and improve consistency of time synchronization between the to-be-synchronized node and the synchronization source node.

In comparison with the prior art, in this embodiment of the present disclosure, first, a synchronization source node selects one or more UEs among user equipments UEs that simultaneously interact with the synchronization source node and a to-be-synchronized node. By interacting with the selected UE, the synchronization source node obtains a timing advance of sending, by the UE, an uplink signal to the synchronization source node, and sends the timing advance to the UE; the to-be-synchronized node receives an indication message of the synchronization source node, and determines the UE selected by the synchronization source node; the to-be-synchronized node sends a downlink message to the UE; the UE determines a moment of sending a specific signal according to a moment of receiving the downlink message sent by the to-be-synchronized node and the timing advance sent by the synchronization source node, and sends the specific signal to the to-be-synchronized node at this moment; the to-be-synchronized node calculates a timing offset according to a moment of receiving the specific signal and a moment of sending the downlink message to the UE; and the to-be-synchronized node adjusts transmitting time according to the obtained timing offset by means of calculation, thereby solving a problem that time synchronization cannot be implemented in the prior art because the to-be-synchronized node is unable to receive a synchronization signal sent by the synchronization source node, performing time synchronization for the to-be-synchronized node on a basis of an existing node device, reducing usage costs, and improving network operation efficiency.

Figure 8:
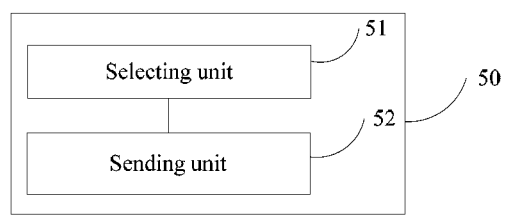
FIG. 8 and FIG. 9 are schematic structural diagrams of an apparatus according to another embodiment of the present disclosure.

Another embodiment of the present disclosure provides a node synchronization apparatus 50. As shown in FIG. 8, the apparatus 50 includes:

a selecting unit 51, configured to select at least one user equipment UE, where the at least one UE is used to assist a second node to synchronize with the apparatus 50; and a sending unit 52, configured to send a notification message to the at least one UE, so that the at least one UE assists the second node to implement synchronization with the apparatus 50.

Figure 9:
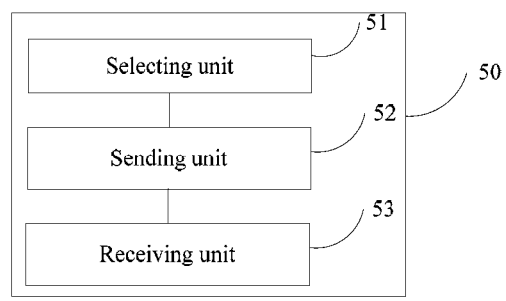

Further, the sending unit 52 is further configured to send a downlink message to the at least one UE. As shown in FIG. 9, the apparatus 50 further includes:

a receiving unit 53, configured to receive a random access message sent by the at least one UE; and the sending unit 52 is further configured to send a timing advance T1 to the at least one UE, where the timing advance T1 is a timing advance of time of sending an uplink signal against time of arrival of a corresponding downlink signal at the UE, where the uplink signal is sent by the at least one UE to the apparatus 50, and the corresponding downlink signal is sent by the apparatus 50 to the at least one UE.

Further, the receiving unit 53 is further configured to receive synchronization request information sent by the second node.

The selecting unit 51 is specifically configured to select, among UEs in coverage according to reference signal received powers RSRPs of the UEs from the second node, a UE on which a power of a reference signal received from the second node is greater than a first preset value, where the RSRPs are sent by the UEs in the coverage; or select, among UEs in coverage according to reference signal received powers RSRPs of the UEs from the apparatus 50, a UE on which a power of a reference signal received from the apparatus 50 is greater than a second preset value, where the RSRPs are sent by the UEs in the coverage; or select, among UEs in coverage according to reference signal received powers RSRPs of the UEs from the apparatus 50 and the second node, a UE on which a power of a reference signal received from the second node is greater than a first preset value and on which a power of a reference signal received from the apparatus 50 is greater than a second preset value, where the RSRPs are sent by the UEs in the coverage.

Further, the sending unit 52 is further configured to send identification information of the at least one UE or random access signal sequence information to the second node, so that the second node determines the at least one UE according to the identification information or the random access signal sequence information.

Further, the receiving unit 53 is further configured to receive a timing offset sent by the at least one UE, where the timing offset is a downlink sending time offset between the second node and the apparatus 50, where the timing offset is determined by the at least one UE according to at least the timing advance T1, a timing advance T2 determined by the second node, a moment of receiving the downlink message of the apparatus 50 by the at least one UE, and a moment of receiving a downlink message of the second node by the at least one UE, where a subframe number of the first subframe is the same as a subframe number of the second subframe, or a subframe number of the first subframe correlates with a subframe number of the second subframe.

Further, the sending unit 52 is further configured to send the timing offset to the second node.

In comparison with the prior art, in this embodiment of the present disclosure, an apparatus 50 selects at least one user equipment UE; the apparatus 50 determines a timing advance T1 applied when the UE sends an uplink signal to the apparatus 50; the apparatus 50 sends the timing advance T1 to the UE, so that the UE uses parameters that include the timing advance T1 to calculate a timing offset between the apparatus 50 and a second node and sends the timing offset to the second node, or so that the UE sends a synchronization-assisting specific signal to a second node according to the timing advance T1, and the second node calculates a timing offset according to the specific signal, and therefore, the second node performs time synchronization by using the received timing offset or the obtained timing offset by means of calculation, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 10:
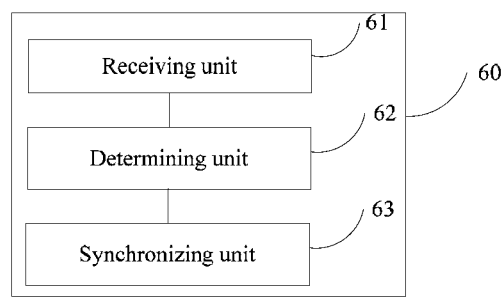
FIG. 10 and FIG. 11 are schematic structural diagrams of an apparatus according to another embodiment of the present disclosure.

Another embodiment of the present disclosure provides a node synchronization apparatus 60. As shown in FIG. 10, the apparatus 60 includes:

a receiving unit 61, configured to receive identification information of at least one user equipment UE or random access signal sequence information sent by a first node;

a determining unit 62, configured to determine the at least one UE according to the identification information of the at least one UE or the random access signal sequence information; and a synchronizing unit 63, configured to implement synchronization with the first node by using the determined at least one UE.

Figure 11:
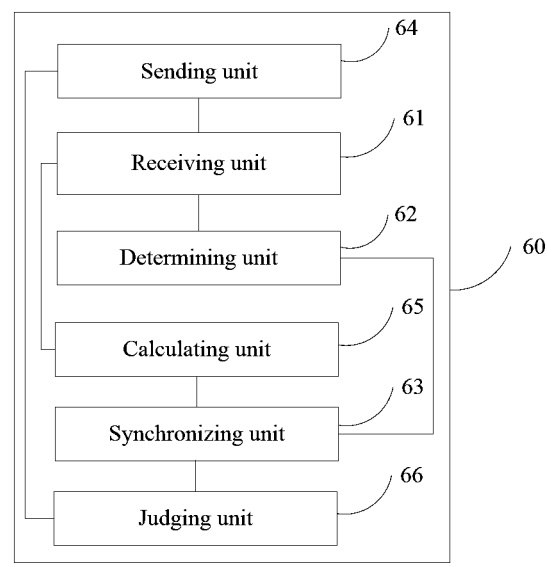

Further, as shown in FIG. 11, the apparatus 60 further includes:

a sending unit 64, configured to send synchronization request information to the first node.

Further, the sending unit 64 is further configured to send a downlink message to the at least one UE, and the receiving unit 61 is further configured to receive a random access message sent by the at least one UE.

Further, the sending unit 64 is further configured to send a timing advance T2 to the UE, where the timing advance T2 is a timing advance of time of sending an uplink signal against time of arrival of a corresponding downlink signal at the UE, where the uplink signal is sent by the at least one UE to the apparatus 60, and the corresponding downlink signal is sent by the apparatus 60 to the at least one UE.

Further, the receiving unit 61 is further configured to receive a timing advance sent by the at least one UE or the first node, where the timing advance is determined by the at least one UE according to at least the timing advance T2, a timing advance T1 determined by the first node, a moment of receiving a downlink message of the first node by the at least one UE, and a moment of receiving the downlink message of the apparatus 60 by the at least one UE.

The synchronizing unit 63 is specifically configured to: adjust transmitting time according to the timing offset, and implement the synchronization with the first node.

Further, as shown in FIG. 11, if the receiving unit 61 receives at least two timing offsets sent by the at least one UE or the first node, the apparatus 60 further includes:

a calculating unit 65, configured to: perform a mathematical operation according to the received at least two timing offsets, and use an operation result as a timing offset for the apparatus 60 to adjust the transmitting time.

Further, as shown in FIG. 8, the apparatus 60 further includes:

a judging unit 66, configured to determine whether a current synchronization offset state exceeds a set threshold; and when the judging unit 66 determines that the current synchronization offset state exceeds the set threshold, the sending unit 64 is further configured to send synchronization request information to the first node.

In comparison with the prior art, in this embodiment of the present disclosure, an apparatus 60 determines one or more UEs according to information sent by a first node; the apparatus 60 interacts with the UEs to determine a timing advance T2 applied when the UE sends an uplink signal to the apparatus 60; sends the timing advance T2 to the UE, so that the UE calculates a timing offset between the apparatus 60 and the first node according to parameters such as the timing advance T2; and the apparatus 60 receives the timing offset sent by the UE or the first node, and adjusts transmitting time according to the timing offset, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 12:
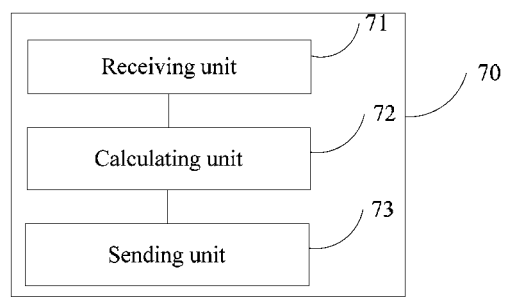
FIG. 12 is a schematic structural diagram of an apparatus according to another embodiment of the present disclosure.

Another embodiment of the present disclosure provides a node synchronization apparatus 70. As shown in FIG. 12, the apparatus 70 includes:

a receiving unit 71, configured to receive a notification message sent by a first node, where the notification message is used to instruct an apparatus 70 to assist a second node to implement synchronization with a first node;

a calculating unit 72, configured to calculate a timing offset between the first node and the second node; and a sending unit 73, configured to send the timing offset to the first node or the second node.

Further, the receiving unit 71 is further configured to receive a downlink message sent by the first node;

the sending unit 72 is further configured to send a random access message to the first node; and the receiving unit 71 is further configured to receive a timing advance T1 sent by the first node, where the timing advance T1 is a timing advance of time of sending an uplink signal against time of arrival of a corresponding downlink signal at the apparatus 70, where the uplink signal is sent by the apparatus 70 to the first node, and the corresponding downlink signal is sent by the first node to the apparatus 70.

Further, the receiving unit 71 is further configured to receive a downlink message sent by the second node;

the sending unit 72 is further configured to send a random access message to the second node; and the receiving unit 71 is further configured to receive a timing advance T2 sent by the second node, where the timing advance T2 is a timing advance of time of sending an uplink signal against time of arrival of a corresponding downlink signal at the apparatus 70, where the uplink signal is sent by the apparatus 70 to the second node, and the corresponding downlink signal is sent by the second node to the apparatus 70.

The calculating unit 72 is specifically configured to calculate the timing offset according to at least a moment t1 of receiving the downlink message sent by the first node, a moment t2 of receiving the downlink message sent by the second node, the timing advance T1, and the timing advance T2.

The calculating unit 72 is further specifically configured to use a formula $$\Delta T = \pm \left(t2 - t1 - \frac{T2 - T1}{2}\right) \text{ or } \Delta T = -\left(t2 - t1 - \frac{T2 - T1}{2}\right)$$

to calculate the timing offset of the second node, where ΔT is the timing offset.

In comparison with the prior art, in this embodiment of the present disclosure, an apparatus 70 receives a notification message sent by a first node, and starts to assist a second node to implement synchronization with the first node; the apparatus 70 calculates a timing offset between the first node and the second node; and the apparatus 70 sends the timing offset to the first node or the second node, so that the second node adjusts transmitting time according to the timing offset and implements time synchronization, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 13:
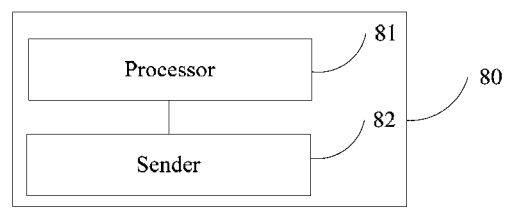
FIG. 13 and FIG. 14 are schematic structural diagrams of a node according to another embodiment of the present disclosure.

Another embodiment of the present disclosure provides a node 80. As shown in FIG. 13, the node 80 includes:

a processor 81, configured to select at least one user equipment UE, where the at least one UE is used to assist a second node to synchronize with the node 80; and a sender 82, configured to send a notification message to the at least one UE, so that the at least one UE assists the second node to implement synchronization with the node 80.

Figure 14:
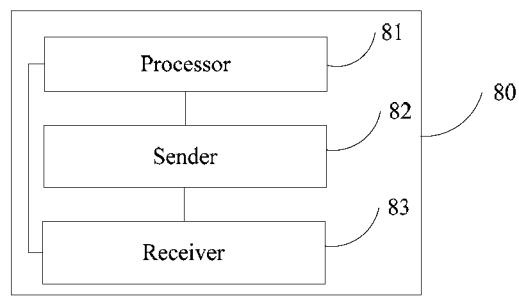

Further, the sender 82 is further configured to send a downlink message to the at least one UE. As shown in FIG. 14, the node 80 further includes:

a receiver 83, configured to receive a random access message sent by the at least one UE; and the sender 82 is further configured to send a timing advance T1 to the at least one UE, where the timing advance T1 is a timing advance of time of sending an uplink signal against time of arrival of a corresponding downlink signal at the UE, where the uplink signal is sent by the at least one UE to the node 80, and the corresponding downlink signal is sent by the node 80 to the at least one UE.

Further, the receiver 83 is further configured to receive synchronization request information sent by the second node.

The processor 81 is specifically configured to select, among UEs in coverage according to reference signal received powers RSRPs of the UEs from the second node, a UE on which a power of a reference signal received from the second node is greater than a first preset value, where the RSRPs are sent by the UEs in the coverage; or select, among UEs in coverage according to reference signal received powers RSRPs of the UEs from the node 80, a UE on which a power of a reference signal received from the node 80 is greater than a second preset value, where the RSRPs are sent by the UEs in the coverage; or select, among UEs in coverage according to reference signal received powers RSRPs of the UEs from the node 80 and the second node, a UE on which a power of a reference signal received from the second node is greater than a first preset value and on which a power of a reference signal received from the node 80 is greater than a second preset value, where the RSRPs are sent by the UEs in the coverage.

Further, the sender 82 is further configured to send identification information of the at least one UE or random access signal sequence information to the second node, so that the second node determines the at least one UE according to the identification information or the random access signal sequence information.

Further, the receiver 83 is further configured to receive a timing offset sent by the at least one UE, where the timing offset is a downlink sending time offset between the second node and the node 80, where a subframe number of the first subframe is the same as a subframe number of the second subframe, or a subframe number of the first subframe correlates with a subframe number of the second subframe.

The timing offset is determined by the at least one UE according to at least the timing advance T1, a timing advance T2 determined by the second node, a moment of receiving the downlink message of the node 80 by the at least one UE, and a moment of receiving a downlink message of the second node by the at least one UE.

Further, the sender 82 is further configured to send the timing offset to the second node.

In comparison with the prior art, in this embodiment of the present disclosure, a node 80 selects at least one user equipment UE; the node 80 determines a timing advance T1 applied when the UE sends an uplink signal to the node 80; the node 80 sends the timing advance T1 to the UE, so that the UE uses parameters that include the timing advance T1 to calculate a timing offset between the node 80 and a second node, and the second node performs time synchronization by using the obtained timing offset by means of calculation, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 15:
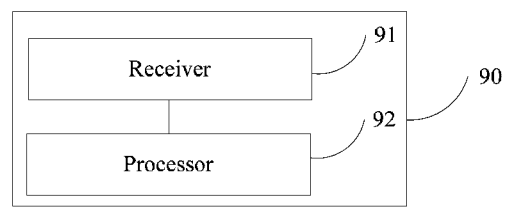
FIG. 15 and FIG. 16 are schematic structural diagrams of a node according to another embodiment of the present disclosure.

Another embodiment of the present disclosure provides a node 90. As shown in FIG. 15, the node 90 includes:

a receiver 91, configured to receive identification information of at least one user equipment UE or random access signal sequence information sent by a first node; and a processor 92, configured to determine the at least one UE according to the identification information of the at least one UE or the random access signal sequence information; and configured to implement synchronization with the first node by using the determined at least one UE.

Figure 16:
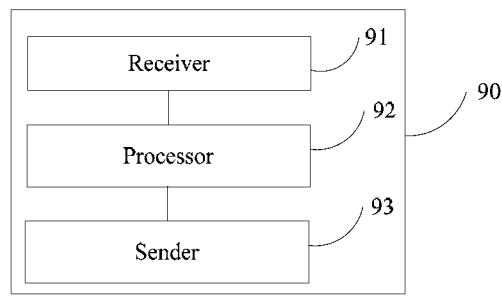

Further, as shown in FIG. 16, the node 90 further includes:

a sender 93, configured to send synchronization request information to the first node.

Further, the sender 93 is further configured to send a downlink message to the at least one UE, and the receiver 91 is further configured to receive a random access message sent by the at least one UE.

The sender 93 is further configured to send a timing advance T2 to the at least one UE, where the timing advance T2 is a timing advance of time of sending an uplink signal against time of arrival of a corresponding downlink signal at the UE, where the uplink signal is sent by the at least one UE to the node 90, and the corresponding downlink signal is sent by the second node to the at least one UE.

Further, the receiver 91 is further configured to receive a timing advance sent by the at least one UE or the first node, where the timing advance is determined by the at least one UE according to at least the timing advance T2, a timing advance T1 determined by the first node, a moment of receiving a downlink message of the first node by the at least one UE, and a moment of receiving the downlink message of the node 90 by the at least one UE.

The processor 92 is specifically configured to: adjust transmitting time according to the timing offset, and implement the synchronization with the first node.

Further, when the receiver 91 receives at least two timing offsets sent by the at least one UE or the first node, the processor 92 is further configured to:

perform a mathematical operation according to the received at least two timing offsets, and use an operation result as a timing offset for the node 90 to adjust the transmitting time.

Further, the processor 92 is further configured to:

determine whether a current synchronization offset state exceeds a set threshold; and when the processor 92 determines that the current synchronization offset state exceeds the set threshold, the sender 93 is further configured to send synchronization request information to the first node.

For a working process of the node 90 provided in this embodiment of the present disclosure, refer to the description in the foregoing method embodiments, and no repeated description is given herein.

In comparison with the prior art, in this embodiment of the present disclosure, a node 90 determines one or more UEs according to information sent by a first node; the node 90 interacts with the UEs to determine a timing advance T2 applied when the UE sends an uplink signal to the node 90; sends the timing advance T2 to the UE, so that the UE calculates a timing offset between the node 90 and the first node according to parameters such as the timing advance T2; and the node 90 receives the timing offset sent by the UE or the first node, and adjusts transmitting time according to the timing offset, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 17:
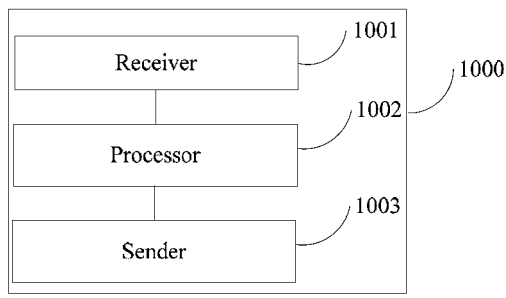
FIG. 17 is a schematic diagram of user equipment according to another embodiment of the present disclosure.

Another embodiment of the present disclosure provides user equipment UE 1000. As shown in FIG. 17, the UE 1000 includes:

a receiver 1001, configured to receive a notification message sent by a first node, where the notification message is used to instruct the user equipment UE 1000 to assist a second node to implement synchronization with a first node;

a processor 1002, configured to calculate a timing offset between the first node and the second node; and a sender 1003, configured to send the timing offset to the first node or the second node.

Further, the receiver 1001 is further configured to receive a downlink message sent by the first node;

the sender 1003 is further configured to send a random access message to the first node; and the receiver 1001 is further configured to receive a timing advance T1 sent by the first node, where the timing advance T1 is a timing advance of time of sending an uplink signal against time of arrival of a corresponding downlink signal at the UE 1000, where the uplink signal is sent by the UE 1000 to the first node, and the corresponding downlink signal is sent by the first node to the apparatus 1000.

Further, the receiver 1001 is further configured to receive a downlink message sent by the second node;

the sender 1003 is further configured to send a random access message to the second node; and the receiver 1001 is further configured to receive a timing advance T2 sent by the second node, where the timing advance T2 is a timing advance of time of sending an uplink signal against time of arrival of a corresponding downlink signal at the UE 1000, where the uplink signal is sent by the UE 1000 to the second node, and the corresponding downlink signal is sent by the second node to the apparatus 1000.

The processor 1002 is specifically configured to calculate the timing offset according to at least a moment t1 of receiving the downlink message sent by the first node, a moment t2 of receiving the downlink message sent by the second node, the timing advance T1, and the timing advance T2.

The processor 1002 is further specifically configured to use a formula $$\Delta T = \pm \left( t2 - t1 - \frac{T2 - T1}{2} \right) \text{ or } \Delta T = -\left( t2 - t1 - \frac{T2 - T1}{2} \right)$$

to calculate the timing offset of the second node, where $\Delta T$ is the timing offset.

For a working process of the user equipment UE 1000 provided in this embodiment of the present disclosure, refer to the description in the foregoing method embodiments, and no repeated description is given herein.

In comparison with the prior art, in this embodiment of the present disclosure, a UE 1000 receives a notification message sent by a first node, and starts to assist a second node to implement synchronization with the first node; the UE 1000 calculates a timing offset between the first node and the second node; and the UE 1000 sends the timing offset to the first node or the second node, so that the second node adjusts transmitting time according to the timing offset and implements time synchronization, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 18:
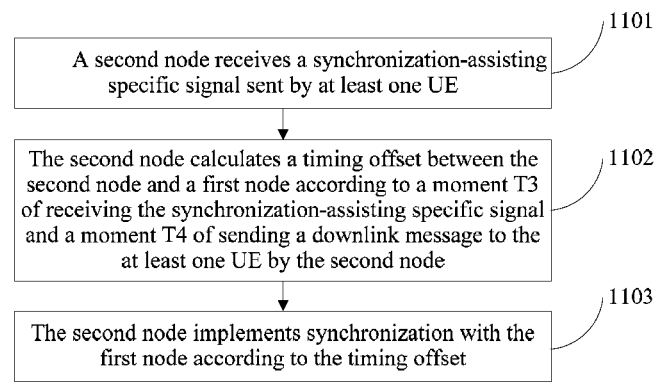
FIG. 18 is a method flowchart according to another embodiment of the present disclosure.

Another embodiment of the present disclosure provides a node synchronization method. As shown in FIG. 18, the method includes:

1101. A second node receives a synchronization-assisting specific signal sent by at least one UE.

1102. The second node calculates a timing offset between the second node and a first node according to a moment T3 of receiving the synchronization-assisting specific signal and a moment T4 of sending a downlink message to the at least one UE by the second node.

1103. The second node implements synchronization with the first node according to the timing offset.

Further, before the receiving, by a second node, a synchronization-assisting specific signal sent by at least one UE, the method further includes:

receiving, by the second node, identification information of the at least one user equipment UE or synchronization-assisting specific signal sequence information sent by the first node; and determining, by the second node, the at least one UE according to the identification information of the at least one UE or the synchronization-assisting specific signal sequence information.

Optionally, before the receiving, by a second node, a synchronization-assisting specific signal sent by at least one UE, the method further includes:

sending, by the second node, a downlink signal to the at least one UE, where the downlink signal is used to indicate sequence information and/or sending resource information of the synchronization-assisting specific signal sent by the at least one UE.

The calculating, by the second node, a timing offset between the second node and a first node according to a moment T3 of receiving the synchronization-assisting specific signal and a moment T4 of sending a downlink message to the at least one UE includes:

using a formula $$\Delta T = \left( \frac{T3 - T4}{2} \right) \text{ or } \Delta T = -\left( \frac{T3 - T4}{2} \right)$$

to calculate the timing offset, where $\Delta T$ is the timing offset.

Optionally, if the second node obtains at least two timing offsets by means of calculation, before the implementing, by the second node, synchronization with the first node according to the timing offset, the method further includes:

performing, by the second node, a mathematical operation according to the at least two timing offsets, and using an operation result as a timing offset for the second node to adjust transmitting time.

For example, the implementing, by the second node, synchronization with the first node according to the timing offset includes:

adjusting, by the second node, the transmitting time according to the timing offset, and implementing the synchronization with the first node.

Optionally, the method further includes:

determining, by the second node, whether a current synchronization offset state exceeds a set threshold; and sending, by the second node, synchronization request information to the first node if the current synchronization offset state exceeds the set threshold.

In comparison with the prior art, in this embodiment of the present disclosure, a second node receives a synchronization-assisting specific signal sent by at least one UE; the second node calculates a timing offset between the second node and a first node according to a moment T3 of receiving the synchronization-assisting specific signal and a moment T4 of sending a downlink message to the at least one UE by the second node; and the second node implements synchronization with the first node according to the timing offset, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 19:
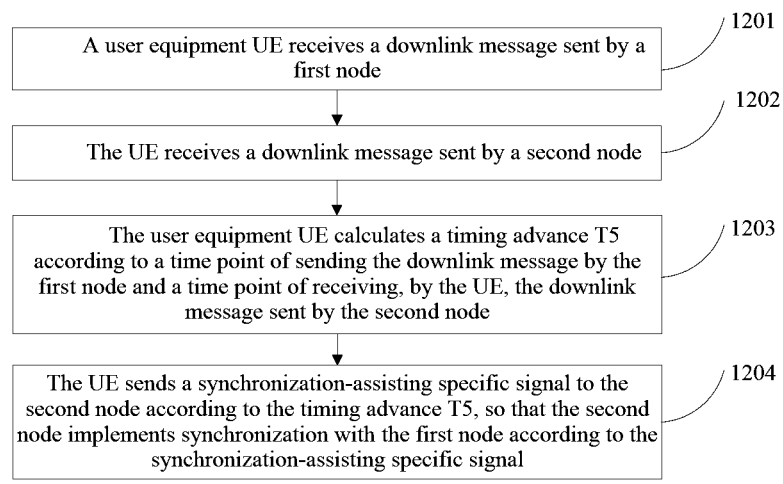
FIG. 19 is a method flowchart according to another embodiment of the present disclosure.

Another embodiment of the present disclosure provides a node synchronization method. As shown in FIG. 19, the method includes:

1201. User equipment UE receives a downlink message sent by a first node.

The downlink message is used to assist a second node to synchronize with the first node.

1202. The UE receives a downlink message sent by a second node.

The downlink message is used to assist the second node to synchronize with the first node.

1203. The user equipment UE calculates a timing advance T5 according to a moment of sending the downlink message by the first node and a moment of receiving, by the UE, the downlink message sent by the second node.

1204. The UE sends a synchronization-assisting specific signal to the second node according to the timing advance T5, so that the second node implements synchronization with the first node according to the synchronization-assisting specific signal.

Further, before calculating a timing advance T5 of sending a synchronization-assisting specific signal to the second node, the method further includes:

receiving, by the user equipment UE, a notification message sent by the first node, where the notification message is used to instruct the UE to assist the second node to implement synchronization with the first node.

The calculating a timing advance T5 includes:

using the following formula to calculate the timing advance T5: $T5 = t2 - T_0$, where t2 is the moment of receiving, by the UE, the downlink message sent by the second node, and $T_0$ is the moment of sending the downlink message by the first node.

Further, before the calculating a timing advance T5, the method further includes:

sending, by the UE, a random access message to the first node according to the received downlink message sent by the first node; and receiving, by the UE, a timing advance T1 sent by the first node, where the timing advance T1 is a timing advance of time of sending an uplink signal against time of arrival of a corresponding downlink signal at the UE, where the uplink signal is sent by the UE to the first node, and the corresponding downlink signal is sent by the first node to the UE.

The moment $T_0$ of sending the downlink message by the first node is obtained by means of calculation according to the following formula:

$$T_0 = t1 - \frac{T1}{2},$$

where t1 is a moment of receiving, by the UE, the downlink message sent by the first node.

Optionally, before the calculating a timing advance T5, the method further includes:

the timing advance T5 is a timing advance of time of sending the synchronization-assisting specific signal against time of sending the downlink message, where the synchronization-assisting specific signal is sent by the UE to the second node, and the downlink message is sent by the first node to the UE.

Optionally, the synchronization-assisting specific signal is a signal of multiplexing a sequence of a random access signal, and the synchronization-assisting specific signal is sent on a time resource and/or a frequency resource different from that of the random access signal; or the synchronization-assisting specific signal is a signal different from the random access signal, where the synchronization-assisting specific signal includes identification information of the second node.

In comparison with the prior art, in this embodiment of the present disclosure, user equipment UE calculates a timing advance T5 according to a moment of sending a downlink message by a first node and a moment of receiving, by the UE, a downlink message sent by a second node; and the UE sends a synchronization-assisting specific signal to the second node according to the timing advance T5, so that the second node implements synchronization with the first node according to the synchronization-assisting specific signal, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 20:
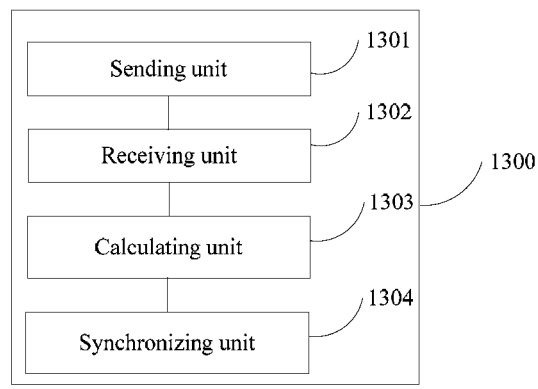
FIG. 20 and FIG. 21 are schematic structural diagrams of an apparatus according to another embodiment of the present disclosure.

Another embodiment of the present disclosure provides a node synchronization apparatus 1300. As shown in FIG. 20, the apparatus 1300 includes:

a sending unit 1301, configured to send a downlink message to at least one user equipment UE;

a receiving unit 1302, configured to receive a synchronization-assisting specific signal sent by the at least one user equipment UE;

a calculating unit 1303, configured to calculate a timing offset between a apparatus 1300 and a first node according to a moment T3 of receiving the synchronization-assisting specific signal and a moment T4 of sending the downlink message to the at least one UE by the apparatus 1300; and a synchronizing unit 1304, configured to implement synchronization with the first node according to the timing offset.

Figure 21:
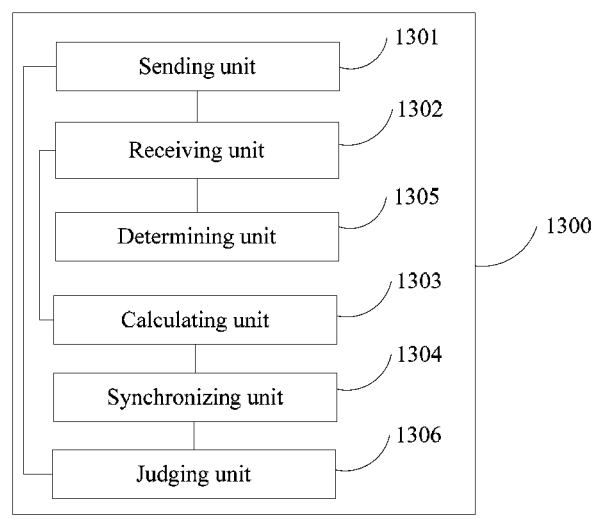

Further, the receiving unit 1302 is further configured to receive identification information of the at least one user equipment UE or synchronization-assisting specific signal sequence information sent by the first node. As shown in FIG. 21, the apparatus 1300 further includes:

a determining unit 1305, configured to determine the at least one UE according to the identification information of the at least one UE or the synchronization-assisting specific signal sequence information.

Further, the sending unit 1301 is further configured to send a downlink signal to the at least one UE, where the downlink signal is used to indicate sequence information and/or sending resource information of the synchronization-assisting specific signal sent by the at least one UE.

The calculating unit 1303 is specifically configured to: use a formula $$\Delta T = \left(\frac{T3 - T4}{2}\right) \text{ or } \Delta T = -\left(\frac{T3 - T4}{2}\right)$$

to calculate the timing offset, where $\Delta T$ is the timing offset.

Further, the calculating unit 1303 is further configured to: when at least two timing offsets are obtained by means of calculation, perform a mathematical operation according to the at least two timing offsets and use an operation result as a timing offset for the apparatus 1300 to adjust transmitting time.

The synchronizing unit 1304 is specifically configured to:
adjust the transmitting time according to the timing offset, and implement the synchronization with the first node.

Further, as shown in FIG. 21, the apparatus 1300 further includes:
a judging unit 1306, configured to determine whether a current synchronization offset state exceeds a set threshold; and
when the judging unit 1306 determines that the current synchronization offset state exceeds the set threshold, the sending unit 1301 is further configured to send synchronization request information to the first node.

In comparison with the prior art, in this embodiment of the present disclosure, an apparatus 1300 receives a synchronization-assisting specific signal sent by at least one user equipment UE; the apparatus 1300 calculates a timing offset between a apparatus 1300 and a first node according to a moment T3 of receiving the synchronization-assisting specific signal and a moment T4 of sending a downlink message to the at least one UE by the apparatus 1300; and the apparatus 1300 implements synchronization with the first node according to the timing offset, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 22:
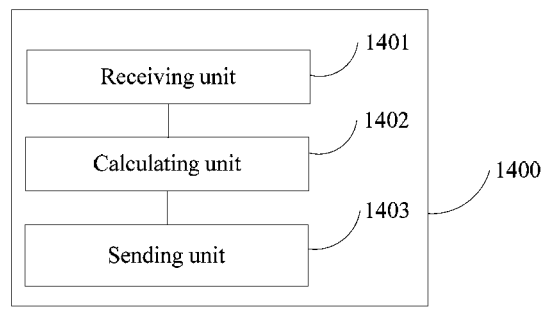
FIG. 22 is a schematic structural diagram of an apparatus according to another embodiment of the present disclosure.

Another embodiment of the present disclosure provides a node synchronization apparatus 1400. As shown in FIG. 22, the apparatus 1400 includes:
a receiving unit 1401, configured to receive a downlink message sent by a first node, where the downlink message is used to assist a second node to synchronize with the first node; and configured to receive a downlink message sent by the second node, where the downlink message is used to assist the second node to synchronize with the first node;
a calculating unit 1402, configured to calculate a timing advance T5 according to a moment of sending the downlink message by the first node and a moment of receiving, by the apparatus 1400, the downlink message sent by the second node; and
a sending unit 1403, configured to send a synchronization-assisting specific signal to the second node according to the timing advance T5, so that the second node implements synchronization with the first node according to the synchronization-assisting specific signal.

Further, the receiving unit 1401 is further configured to receive a notification message sent by the first node, where the notification message is used to instruct the apparatus 1400 to assist the second node to implement synchronization with the first node.

The calculating unit 1402 is specifically configured to:
use the following formula to calculate the timing advance T5: T5=t2−$T_0$, where t2 is the moment of receiving, by the apparatus 1400, the downlink message sent by the second node, and $T_0$ is the moment of sending the downlink message by the first node.

Further, the sending unit 1403 is further configured to send a random access message to the first node; and
the receiving unit 1401 is further configured to receive a timing advance T1 sent by the first node, where the timing advance T1 is a timing advance of time of sending an uplink signal against time of arrival of a corresponding downlink signal at the apparatus 1400, where the uplink signal is sent by the apparatus 1400 to the first node, and the corresponding downlink signal is sent by the first node to the apparatus 1400.

Further, the receiving unit 1401 is further configured to receive a downlink message sent by the second node.

In comparison with the prior art, in this embodiment of the present disclosure, an apparatus 1400 calculates a timing advance T5 according to a moment of sending a downlink message by a first node and a moment of receiving, by the user equipment apparatus 1400, a downlink message sent by a second node; and the apparatus 1400 sends a synchronization-assisting specific signal to the second node according to the timing advance T5, so that the second node implements synchronization with the first node according to the synchronization-assisting specific signal, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 23:
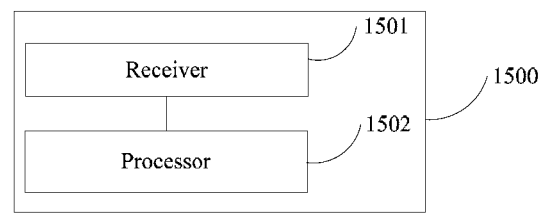
FIG. 23 and FIG. 24 are schematic structural diagrams of a node according to another embodiment of the present disclosure.

Another embodiment of the present disclosure provides a node 1500. As shown in FIG. 23, the node 1500 includes:
a receiver 1501, configured to receive a synchronization-assisting specific signal sent by at least one apparatus 1400;
a processor 1502, configured to calculate a timing offset between the node 1500 and a first node according to a moment T3 of receiving the synchronization-assisting specific signal and a moment T4 of sending the downlink message to the at least one apparatus 1400 by the node 1500; and configured to implement synchronization with the first node according to the timing offset.

Further, the receiver 1501 is further configured to receive identification information of the at least one user equipment UE or synchronization-assisting specific signal sequence information sent by the first node, and the processor 1502 is further configured to:
determine the at least one UE according to the identification information of the at least one UE or the synchronization-assisting specific signal sequence information.

Figure 24:
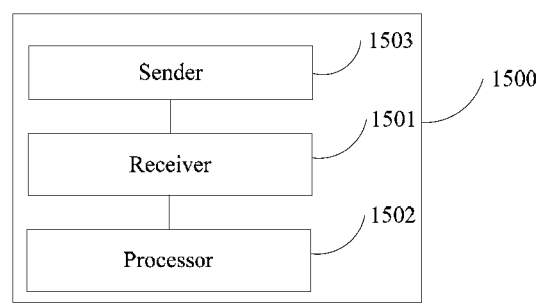

Further, as shown in FIG. 24, the node 1500 further includes:
a sender 1503, configured to send a downlink signal to the at least one UE, where the downlink signal is used to indicate sequence information and/or sending resource information of the synchronization-assisting specific signal sent by the at least one UE.

The processor 1502 is specifically configured to:
use a formula $$\Delta T = \left(\frac{T3 - T4}{2}\right) \text{ or } \Delta T = -\left(\frac{T3 - T4}{2}\right)$$

to calculate the timing offset, where ΔT is the timing offset.

Further, the processor 1502 is further configured to:
when at least two timing offsets are obtained by means of calculation, perform a mathematical operation according to the at least two timing offsets and use an operation result as a timing offset for the node 1500 to adjust transmitting time.

The processor 1502 is further specifically configured to:
adjust the transmitting time according to the timing offset, and implement the synchronization with the first node.

Further, the processor 1502 is further configured to:

determine whether a current synchronization offset state exceeds a set threshold; and when the processor 1502 determines that the current synchronization offset state exceeds the set threshold, the sender 1503 is further configured to send synchronization request information to the first node.

For a working process of the node 1500 provided in this embodiment of the present disclosure, refer to the description in the foregoing method embodiments, and no repeated description is given herein.

In comparison with the prior art, in this embodiment of the present disclosure, a node 1500 receives a synchronization-assisting specific signal sent by at least one UE; the node 1500 calculates a timing offset between the node 1500 and a first node according to a moment T3 of receiving the synchronization-assisting specific signal and a moment T4 of sending a downlink message to the at least one UE by the node 1500; and the node 1500 implements synchronization with the first node according to the timing offset, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 25:
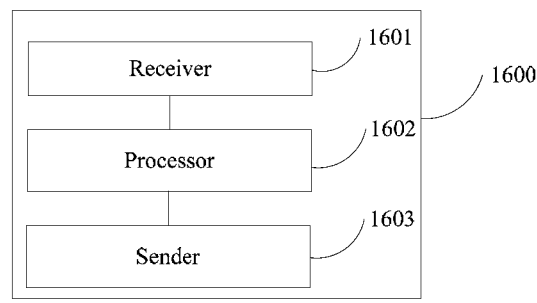
FIG. 25 is a schematic diagram of user equipment according to another embodiment of the present disclosure.
Figure 26:
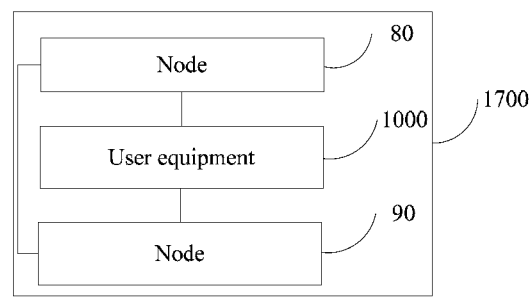
FIG. 26 and FIG. 27 are schematic structural diagrams of a communications system according to another embodiment of the present disclosure.

Another embodiment of the present disclosure provides user equipment UE 1600. As shown in FIG. 25, the UE 1600 includes:

a receiver 1601, configured to receive a downlink message sent by a first node, where the downlink message is used to assist a second node to synchronize with the first node; and configured to receive a downlink message sent by the second node, where the downlink message is used to assist the second node to synchronize with the first node;

a processor 1602, configured to calculate a timing advance T5 according to a moment of sending the downlink message by the first node and a moment of receiving, by the UE 1600, the downlink message sent by the second node; and a sender 1603, configured to send a synchronization-assisting specific signal to the second node according to the timing advance T5, so that the second node implements synchronization with the first node according to the synchronization-assisting specific signal.

Further, the receiver 1601 is further configured to receive a notification message sent by the first node, where the notification message is used to instruct the UE 1600 to assist the second node to implement synchronization with the first node.

The processor 1601 is specifically configured to use the following formula to calculate the timing advance T5: T5=t2−$T_0$, where t2 is the moment of receiving, by the UE 1600, the downlink message sent by the second node, and $T_0$ is the moment of sending the downlink message by the first node.

Further, the sender 1602 is further configured to send a random access message to the first node; and the receiver 1603 is further configured to receive a timing advance T1 sent by the first node, where the timing advance T1 is a timing advance of time of sending an uplink signal against time of arrival of a corresponding downlink signal at the UE, where the uplink signal is sent by the UE to the first node, and the corresponding downlink signal is sent by the first node to the UE 1600.

For a working process of the user equipment UE 1600 provided in this embodiment of the present disclosure, refer to the description in the foregoing method embodiments, and no repeated description is given herein.

In comparison with the prior art, in this embodiment of the present disclosure, a UE 1600 calculates a timing advance T5 according to a moment of sending a downlink message by a first node and a moment of receiving, by the user equipment UE 1600, a downlink message sent by a second node; and the UE 1600 sends a synchronization-assisting specific signal to the second node according to the timing advance T5, so that the second node implements synchronization with the first node according to the synchronization-assisting specific signal, thereby solving a problem that time synchronization cannot be implemented in the prior art because a to-be-synchronized node is unable to receive a synchronization signal sent by a synchronization source node, performing time synchronization for the to-be-synchronized node on a basis of an existing node device, reducing usage costs, and improving network operation efficiency.

Figure 27:
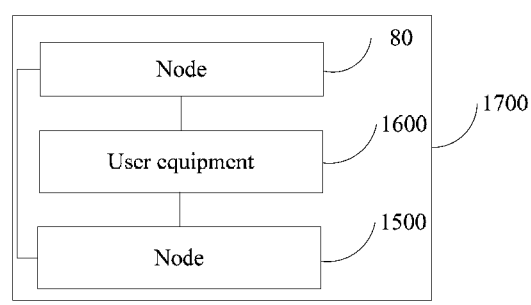

Another embodiment of the present disclosure provides a communications system 1700. As shown in 26, the communications system 1700 includes: the node 80, the node 90, and the user equipment UE 1000 in the foregoing embodiments; or, as shown in FIG. 27, the communications system 1700 includes: the node 80, the node 1500, and the user equipment UE 1600 in the foregoing embodiments.

For working processes of the node 80, the node 90, the node 1500, the user equipment UE 1600, and the user equipment UE 1000 in the communications system 1100 provided in this embodiment of the present disclosure, refer to the description in the foregoing method embodiments, and no repeated description is given herein.

The node synchronization apparatus provided in the embodiments of the present disclosure can implement the method embodiments provided above. For specific function implementation, refer to the description in the method embodiments, and no repeated description is given herein. The node synchronization method and apparatus provided in the embodiments of the present disclosure can be applied to, but not limited to, time synchronization between communications nodes.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A to-be-synchronized node synchronization method, comprising:
 receiving, by the to-be-synchronized node, either:
  an identification information of a user equipment (UE) selected by a synchronization source node, or
  a random access signal sequence information sent by the synchronization source node;
 determining, by the to-be-synchronized node after the receiving, the UE according to the identification information of the UE or the random access signal sequence information; and implementing, by the to-be-synchronized node after the determining, synchronization with the synchronization source node through the determined at least one UE, wherein after the determining and before the implementing, the method further comprises:

sending, by the to-be-synchronized node to the UE, a downlink message;

receiving, by the to-be-synchronized node, a random access message sent by the UE; and sending, by the to-be-synchronized node to the UE, a timing advance T2, wherein the timing advance T2 indicates a timing advance of time of an uplink signal being sent against time of a corresponding downlink signal arriving at the UE, wherein the uplink signal is sent by the UE to the to-be-synchronized node, and wherein the corresponding downlink signal is sent by the to-be-synchronized node to the UE.

2. The method according to claim 1, wherein during the implementing, the method further comprises:

receiving, by the to-be-synchronized node, a timing advance sent by the UE or the synchronization source node, wherein the timing advance is determined by the UE according to at least one of the group consisting of: the timing advance T2, a timing advance T1 determined by the synchronization source node, a moment of receiving by the at least one UE a downlink message of the synchronization source node and a moment of receiving by the UE the downlink message of the to-be-synchronized node.

3. A node synchronization method, comprising:

receiving, by a user equipment (UE), a notification message sent by a synchronization source node, wherein the notification message is used to instruct the UE to assist a to-be-synchronized node to implement synchronization with the synchronization source node;

obtaining, by the UE after the receiving, a timing offset between the synchronization source node and the to-be-synchronized node; and sending by the UE the timing offset to the synchronization source node or the to-be-synchronized node, wherein before the obtaining, by the UE, the timing offset between the synchronization source node and the to-be-synchronized node, the method further comprises:

receiving, by the UE, a downlink message sent by the synchronization source node;

sending, by the UE, a random access message to the synchronization source node; and receiving, by the UE, a timing advance T1 sent by the synchronization source node, wherein the timing advance T1 indicates a timing advance of time of an uplink signal being sent against time of a corresponding downlink signal arriving at the UE, wherein the uplink signal is sent by the UE to the synchronization source node, and wherein the corresponding downlink signal is sent by the synchronization source node to the UE, wherein before the obtaining, by the UE, the timing offset between the synchronization source node and the to-be-synchronized node, the method further comprises:

receiving, by the UE, a downlink message sent by the to-be-synchronized node;

sending, by the UE to the to-be-synchronized node, a random access message; and receiving, by the UE, a timing advance T2 sent by the to-be-synchronized node, wherein the timing advance T2 indicates a timing advance of time of an uplink signal being sent against time of a corresponding downlink signal arriving at the UE, wherein the uplink signal is sent by the UE to the to-be-synchronized node, and wherein the corresponding downlink signal is sent by the to-be-synchronized node to the UE.

4. The method according to claim 3, wherein the obtaining, by the UE, the timing offset between the synchronization source node and the to-be-synchronized node comprises:

obtaining, by the UE, the timing offset according to at least one of the group consisting of: a moment t1 of receiving the downlink message sent by the synchronization source node, a moment t2 of receiving the downlink message sent by the to-be-synchronized node, the timing advance T1, and the timing advance T2.

5. A to-be-synchronized node comprising:

a processor; and a non-transitory computer-readable medium including computer-executable instructions that, when executed by the processor, facilitate performing a method comprising:

receiving, by the to-be-synchronized node, either:
an identification information of a user equipment (UE) selected by a synchronization source node, or
a random access signal sequence information sent by the synchronization source node;

determining, by the to-be-synchronized node after the receiving, the UE according to the identification information of the UE or the random access signal sequence information; and implementing, by the to-be-synchronized node after the determining, synchronization with the synchronization source node through the determined UE, wherein the method, after the determining and before the implementing, further comprises:

sending, by the to-be-synchronized node to the UE, a downlink message, and receiving, by the to-be-synchronized node, a random access message sent by the UE; and sending, by the to-be-synchronized node to the UE, a timing advance T2, wherein the timing advance T2 is a timing advance of time of an uplink signal being sent against time of a corresponding downlink signal arriving at the UE, wherein the uplink signal is sent by the UE to the node, and wherein the corresponding downlink signal is sent by the node to the UE.

6. The to-be-synchronized node according to claim 5, wherein the implementing comprises:

receiving, by the to-be-synchronized node, a timing advance sent by the UE or the synchronization source node, wherein the timing advance is determined by the UE according to at least one of the group consisting of: the timing advance T2, a timing advance T1 determined by the synchronization source node, a moment of receiving by the UE a downlink message of the synchronization source node, and a moment of receiving by the UE the downlink message of the node.

7. A user equipment (UE), comprising:

a processor; and a non-transitory computer-readable medium including computer-executable instructions that, when executed by the processor, facilitate performing a method comprising:

receiving, by the UE, a notification message sent by a synchronization source node, wherein the notification message is used to instruct the UE to assist a to-be-synchronized node to implement synchronization with the synchronization source node;

obtaining, by the UE after the receiving, a timing offset between the synchronization source node and the to-be-synchronized node; and sending, by the UE, the timing offset to the synchronization source node or the to-be-synchronized node, receiving by the UE, a downlink message sent by the synchronization source node;

sending, by the UE to the synchronization source node, a random access message; and receiving, by the UE, a timing advance T1 sent by the synchronization source node, wherein the timing advance T1 is a timing advance of time of an uplink signal being sent against time of a corresponding downlink signal arriving at the UE, wherein the uplink signal is sent by the UE to the synchronization source node, and wherein the corresponding downlink signal is sent by the synchronization source node to the UE, wherein the method further comprises:

receiving, by the UE, a downlink message sent by the to-be-synchronized node;

sending, by the UE to the to-be-synchronized node, a random access message; and receiving, by the UE, a timing advance T2 sent by the to-be-synchronized node, wherein the timing advance T2 is a timing advance of time of an uplink signal being sent against time of a corresponding downlink signal arriving at the UE, wherein the uplink signal is sent by the UE to the to-be-synchronized node, and wherein the corresponding downlink signal is sent by the to-be-synchronized node to the UE.

8. The user equipment according to claim 7, wherein the obtaining, by the UE, the timing offset between the synchronization source node and the to-be-synchronized node comprises:

obtaining, by the UE, the timing offset according to at least one of the group consisting of: a moment t1 of receiving the downlink message sent by the synchronization source node, a moment t2 of receiving the downlink message sent by the to-be-synchronized node, the timing advance T1, and the timing advance T2.

* * * * *